(12) United States Patent
Ikeda

(10) Patent No.: US 9,807,310 B2
(45) Date of Patent: Oct. 31, 2017

(54) FIELD DISPLAY SYSTEM, FIELD DISPLAY METHOD, AND FIELD DISPLAY PROGRAM

(71) Applicant: NEC Corporation, Tokyo (JP)

(72) Inventor: Hiroo Ikeda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/649,304

(22) PCT Filed: Nov. 29, 2013

(86) PCT No.: PCT/JP2013/007024
§ 371 (c)(1),
(2) Date: Jun. 3, 2015

(87) PCT Pub. No.: WO2014/087620
PCT Pub. Date: Jun. 12, 2014

(65) Prior Publication Data
US 2015/0304568 A1     Oct. 22, 2015

(30) Foreign Application Priority Data

Dec. 6, 2012 (JP) ................................. 2012-267552

(51) Int. Cl.
*H04N 5/232*     (2006.01)
*H04N 5/247*     (2006.01)
(Continued)

(52) U.S. Cl.
CPC ..... *H04N 5/23296* (2013.01); *G06K 9/00771* (2013.01); *G06K 9/46* (2013.01);
(Continued)

(58) Field of Classification Search
CPC .. H04N 5/23296; H04N 7/18; H04N 5/23293; H04N 5/265; H04N 5/247;
(Continued)

(56) References Cited

U.S. PATENT DOCUMENTS

| 6,084,908 A | 7/2000 | Chiang et al. |
| 2008/0304706 A1* | 12/2008 | Akisada ............. G06K 9/00771 382/103 |

(Continued)

FOREIGN PATENT DOCUMENTS

| CN | 101321271 A | 12/2008 |
| CN | 101635838 A | 1/2010 |

(Continued)

OTHER PUBLICATIONS

International Search Report and Written Opinion of ISA mailed Feb. 4, 2014 in corresponding PCT International Application.

(Continued)

*Primary Examiner* — Mekonnen Dagnew
(74) *Attorney, Agent, or Firm* — Finnegan, Henderson, Farabow, Garrett & Dunner, L.L.P.

(57) ABSTRACT

A field display system is provided which can intelligibly present to a user a range in which a camera can capture an image of an entire target to be monitored or a certain part or more of the target to be monitored. A projecting unit 5 projects a position in an image captured by a camera, on a plurality of monitoring domains obtained by moving, in parallel, a region to be monitored which defines a range to be checked for an image capturing situation of the camera, the monitoring domain being determined based on a height of a target to be monitored, an image of which is captured by the camera, and specifies fields of the plurality of monitoring domains as a range an image of which the camera can capture without being blocked by an obstacle. An integrating unit 6 integrates the fields in the monitoring domains. The display control unit 7 causes the display apparatus to display an integration result of the fields.

19 Claims, 34 Drawing Sheets

(51) Int. Cl.
*G06K 9/46* (2006.01)
*G06K 9/52* (2006.01)
*G06T 3/00* (2006.01)
*H04N 5/265* (2006.01)
*G06K 9/00* (2006.01)
*H04N 9/31* (2006.01)
*H04N 7/18* (2006.01)

(52) U.S. Cl.
CPC ............... *G06K 9/52* (2013.01); *G06T 3/00* (2013.01); *H04N 5/23222* (2013.01); *H04N 5/23293* (2013.01); *H04N 5/247* (2013.01); *H04N 5/265* (2013.01); *H04N 9/3194* (2013.01); *G06K 2009/4666* (2013.01); *H04N 7/18* (2013.01)

(58) Field of Classification Search
CPC .. H04N 5/23222; G06K 9/00771; G06K 9/46; G06K 9/52; G06K 2009/4666; G06T 3/00; G06T 7/0081
See application file for complete search history.

(56) References Cited

U.S. PATENT DOCUMENTS

| 2009/0109241 | A1  | 4/2009 | Tsujimoto |
| 2010/0118116 | A1* | 5/2010 | Tomasz ................. G01C 11/02 348/36 |
| 2010/0134264 | A1* | 6/2010 | Nagamine ............. B60Q 9/005 340/435 |

FOREIGN PATENT DOCUMENTS

| JP | 2008-146113 | 6/2008 |
| JP | 2008-306604 | 12/2008 |
| JP | 2009-239821 | 10/2009 |

OTHER PUBLICATIONS

Notification of First Office Action mailed on Apr. 18, 2017, by the State Intellectual Property Office of the People's Republic of China in counterpart Chinese Patent Application No. 2013800526044.

* cited by examiner

FIELD DISPLAY SYSTEM, FIELD DISPLAY METHOD, AND FIELD DISPLAY PROGRAM

CROSS-REFERENCE TO RELATED PATENT APPLICATIONS

This application is a National Stage Entry of International Application No. PCT/JP2013/007024, filed Nov. 29, 2013, which claims priority from Japanese Patent Application No. 2012-267552, filed Dec. 6, 2012. The entire contents of the above-referenced applications are expressly incorporated herein by reference.

TECHNICAL FIELD

The present invention relates to a field display system, a field display method and a field display program which specify a field of a camera which can capture an image of a target to be monitored well and display this field.

BACKGROUND ART

Patent Literature 1 discloses a technique of displaying an image capturing range of a camera. According to the technique disclosed in Patent Literature 1, when, for example, a camera position is specified on a top view of a predetermined area displayed on a display apparatus, a horizontal field of view, which is a projected image capturing range of the camera, is displayed on this top view, and a vertical field of view, which includes an optical axis of the camera and is a field of view of the camera in a plane vertical to a horizontal plane, is displayed in an elevation view. FIG. 34 is a schematic view illustrating a horizontal field of view and a vertical field of view displayed by the technique disclosed in Patent Literature 1.

According to the technique disclosed in Patent Literature 1, when, for example, a camera position is specified on a top view 100, a camera indicator 101 representing a camera is displayed on the top view 100. Further, a user adjusts the height of the camera by dragging a camera indicator 111 displayed in an elevation view 107. When the camera position is specified, the calculated horizontal field of view 105 is displayed on the top view 100, and the vertical field of view 115 is displayed on the elevation view 107. The vertical field of view 115 includes an optical axis 110 of the camera. Further, when an icon of a person is dragged and dropped on the top view 100, a person indicator 102 is displayed at this position, and a person indicator 112 is also displayed in the elevation view 107. Similarly, by specifying a position at which a wall as an obstacle for the camera exists, a wall indicator 103 is displayed in the top view. In addition, in FIG. 34, a person indicator in the top view 100 is assigned a reference numeral "102", and a person indicator in the elevation view 107 is assigned a reference numeral "112".

According to the technique disclosed in Patent Literature 1, the above display is provided to present a relationship between fields of view of the camera, and a wall and a person in a predetermined area to adjust an arrangement position of the camera.

CITATION LIST

Patent Literature

PLT 1: Japanese Patent Application Laid-Open No. 2009-239821

SUMMARY OF INVENTION

Technical Problem

However, according to the technique disclosed in Patent Literature 1, it is not possible to explicitly display a range in which the camera can capture an image of the entire target to be monitored (a person in this example). For example, in the top view 100 illustrated in FIG. 34, the person indicator 102 is within the horizontal field of view 105. However, this does not necessarily mean that the camera can capture an image of the entirety of the person. In an example illustrated in FIG. 34, only a portion corresponding to the feet of the person indicator 112 in the elevation view 107 is within the vertical field of view 115. Hence, only an image of the feet of the person is captured. To find a range in which the camera can capture an image of the entirety of the person, it is necessary to manually drag the person indicator 102, check both of the top view 100 and the elevation view 107 and specify a range in which the person indicator is included in both of the horizontal field of view 105 and the vertical field of view 115. Further, it is preferable to determine an optimal arrangement state of the camera so as to maximize a range in which the camera captures an image of the entirety of the person. However, according to the technique disclosed in Patent Literature 1, to specify such a range, while changing the arrangement state of the camera, a range in which the camera can capture an image of the entirety of a person is manually specified. Hence, an operation burden is heavy, and it is difficult to determine an optimal arrangement state of the camera. Particularly when there is a plurality of cameras, it is more difficult to adjust each camera in a good arrangement state.

Further, according to the technique disclosed in Patent Literature 1, only the vertical field of view 115 in the plane including the optical axis 110 is displayed as the vertical field of view 115. Hence, even when an obstacle such as the wall indicator 103 is arranged in a direction other than the optical axis in the top view 100, it is not possible to explicitly display whether a person hides behind this obstacle.

It is therefore an object of the present invention to provide a field display system, a field display method and a field display program which can intelligibly present to a user a range in which a camera can capture an image of an entire target to be monitored or a certain part or more of the target to be monitored.

Solution to Problem

A field display system according to the present invention includes: projecting means configured to project a position in an image captured by a camera, on a plurality of monitoring domains obtained by moving, in parallel, a region to be monitored which defines a range to be checked for an image capturing situation of the camera, the monitoring domain being determined based on a height of a target to be monitored, an image of which is captured by the camera, and to specify fields of the plurality of monitoring domains as a range an image of which the camera captures without being blocked by an obstacle; integrating means configured to integrate the fields in the monitoring domains; and display control means configured to cause a display apparatus to display an integration result of the fields.

Further, a field display system according to the present invention includes: projecting means configured to project a position in an image captured by a camera, on a plurality of monitoring domains obtained by moving, in parallel, a region to be monitored which defines a range to be checked for an image capturing situation of the camera, the monitoring domain being determined based on a height of a target to be monitored, an image of which is captured by the camera, and to specify fields of the plurality of monitoring domains as a range an image of which the camera captures without being blocked by an obstacle; segmenting means configured to segment each monitoring domain based on how many fields of cameras each monitoring domain corresponds to; and display control means configured to cause the display apparatus to display each monitoring domain to display a region segmented in an individual monitoring domain according to a mode which supports the number of cameras which include the region in the fields.

Further, a field display method according to the present invention includes: projecting a position in an image captured by a camera, on a plurality of monitoring domains obtained by moving, in parallel, a region to be monitored which defines a range to be checked for an image capturing situation of the camera, the monitoring domain being determined based on a height of a target to be monitored, an image of which is captured by the camera, and specifying fields of the plurality of monitoring domains as a range an image of which the camera captures without being blocked by an obstacle; integrating the fields in the monitoring domains; and causing a display apparatus to display an integration result of the fields.

Furthermore, a field display method according to the present invention includes: projecting a position in an image captured by a camera, on a plurality of monitoring domains obtained by moving, in parallel, a region to be monitored which defines a range to be checked for an image capturing situation of the camera, the monitoring domain being determined based on a height of a target to be monitored, an image of which is captured by the camera, and specifying fields of the plurality of monitoring domains as a range an image of which the camera captures without being blocked by an obstacle; segmenting each monitoring domain based on how many fields of cameras each monitoring domain corresponds to; and causing the display apparatus to display each monitoring domain to display a region segmented in an individual monitoring domain according to a mode which supports the number of cameras which include the region in the fields.

Furthermore, a field display program according to the present invention causes a computer to execute: projection processing of projecting a position in an image captured by a camera, on a plurality of monitoring domains obtained by moving, in parallel, a region to be monitored which defines a range to be checked for an image capturing situation of the camera, the monitoring domain being determined based on a height of a target to be monitored, an image of which is captured by the camera, and specifying fields of the plurality of monitoring domains as a range an image of which the camera captures without being blocked by an obstacle; integration processing of integrating the fields in the monitoring domains; and display control processing of causing a display apparatus to display an integration result of the fields.

Still further, a field display program according to the present invention causes a computer to execute: projection processing of projecting a position in an image captured by a camera, on a plurality of monitoring domains obtained by moving, in parallel, a region to be monitored which defines a range to be checked for an image capturing situation of the camera, the monitoring domain being determined based on a height of a target to be monitored, an image of which is captured by the camera, and specifying fields of the plurality of monitoring domains as a range an image of which the camera captures without being blocked by an obstacle; segmentation processing of segmenting each monitoring domain based on how many fields of cameras each monitoring domain corresponds to; and display control processing of causing a display apparatus to display each monitoring domain to display a region segmented in an individual monitoring domain according to a mode which supports the number of cameras which include the region in the fields.

Advantageous Effects of Invention

According to the present invention, it is possible to intelligibly present to a user a range in which a camera can capture an image of an entire target to be monitored or a certain part or more of the target to be monitored.

DESCRIPTION OF EMBODIMENTS

Figure 1:
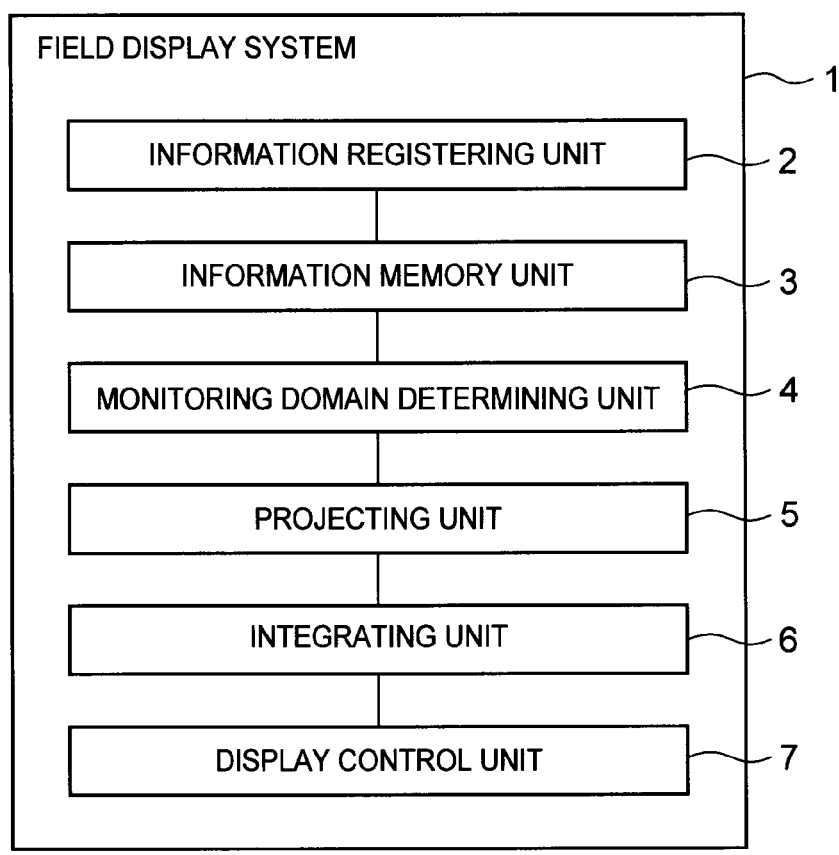
FIG. 1 It depicts a block diagram illustrating an exemplary configuration of a field display system according to a first exemplary embodiment of the present invention.

Hereinafter, exemplary embodiments of the present invention will be described with reference to the drawings.
First Exemplary Embodiment
FIG. 1 depicts a block diagram illustrating an exemplary configuration of a field display system according to a first exemplary embodiment of the present invention. A field display system 1 according to the present invention includes an information registering unit 2, an information memory unit 3, a monitoring domain determining unit 4, a projecting unit 5, an integrating unit 6, and a display control unit 7.

The information memory unit 3 is a memory device which stores information (camera parameters) related to a camera such as an arrangement position, a posture, an angle of view and lens distortion of the camera, a screen size of the camera, information which indicates a region to be monitored, information related to a target to be monitored such as a position and a height of the target to be monitored, an image of which is captured by the camera, and information related to an obstacle such as a position and a height of the obstacle arranged in the region to be monitored. The information registering unit 2 receives, for example, an input of these pieces of information by a user operation, and the information registering unit 2 stores the input information in the information memory unit 3. A case will be described as an example below where a target to be monitored is a person. Further, when a plurality of cameras is assumed, the user inputs camera parameters per camera, and the information registering unit 2 stores the camera parameters of each camera in the information memory unit 3.

The region to be monitored is a domain which defines a range to be checked for an image capturing situation of the camera, and is determined as a domain in a horizontal plane. A three-dimensional space, which is determined by moving this region to be monitored in parallel in the vertical direction, is defined as a range to be checked for an image capturing situation of the camera. For example, a domain of a floor of a room in which cameras are installed may be defined as a region to be monitored. In this example, a three-dimensional space determined by moving this region in parallel upward in the vertical direction is a range to be checked for an image capturing situation.

Figure 2:
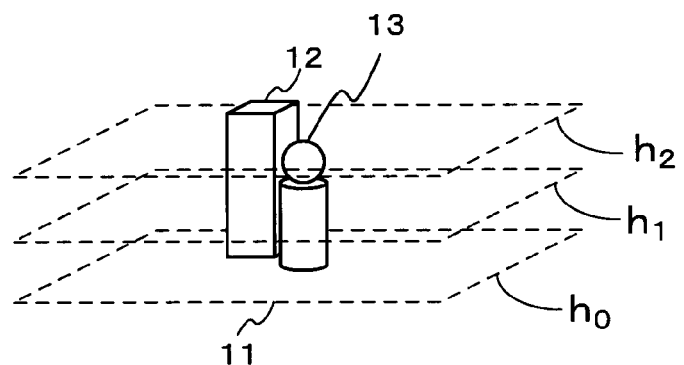
FIG. 2 It depicts a schematic view illustrating an example of a monitoring domain.

The monitoring domain determining unit 4 refers to information which indicates a region to be monitored stored in the information memory unit 3 and information related to the target to be monitored, and determines a plurality of monitoring domains based on a height of the target to be monitored. A monitoring domain is a domain determined by moving a region to be monitored in parallel. Hence, the size of the monitoring domain is the same as that of the region to be monitored. The monitoring domain determining unit 4 determines a plurality of monitoring domains in a range from the vicinity of a lower end (for example, the toe of the person) of the target to be monitored to the vicinity of an upper end (for example, the head of the person) of the target to be monitored. A plurality of monitoring domains includes a monitoring domain in the vicinity of a lower end of a target to be monitored and a monitoring domain in the vicinity of an upper end thereof. FIG. 2 depicts a schematic view illustrating an example of a monitoring domain. In an example illustrated in FIG. 2, information which indicates a region to be monitored 11, information which indicates a person 13, and information which indicates an obstacle 12 are stored in the information memory unit 3. Further, FIG. 2 illustrates a case where the monitoring domain determining unit 4 determines three monitoring domains $h_0$ to $h_2$ in the range from the vicinity of the lower end of the person 13 to the vicinity of the upper end thereof. In this example, the monitoring domain $h_0$ at the lower end of the person 13 is the same region as the region to be monitored 11.

Next, the projecting unit 5 will be described. First, a coordinate system and an image region of an image captured by the camera will be described. When the camera parameters and the screen size of the camera are determined, a two-dimensional coordinate system of an image obtained by this camera (an image captured by the camera), and a region corresponding to this image in this coordinate system are determined. This region is referred to as an image region. An image region is a region which indicates an entire screen of an image captured by the camera. An image region is determined per camera.

Figure 3:
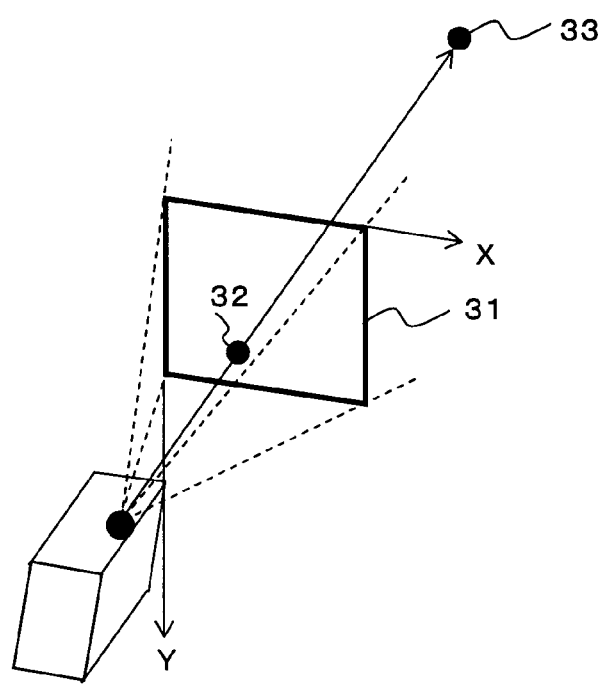
FIG. 3 It depicts an explanatory view illustrating a coordinate system of an image.

FIG. 3 depicts an explanatory view illustrating a coordinate system of an image captured by the camera. As illustrated in FIG. 3, a random position 32 in the image captured by the camera is represented as a coordinate of an xy coordinate system (that is, the two-dimensional coordinate system) in front of the camera. Further, the image region 31 is a region which indicates an entire screen of this image, and is a region in this xy coordinate system. According to the camera parameters and the screen size, the image region 31 is determined.

Further, calculating, from a line which passes a camera position and a position in the image region 31, a coordinate in a three-dimensional space corresponding to this position in the image region 31 is referred to as "projection". For example, calculating a position 33 in the three-dimensional space corresponding to the position 32 in the image region 31 represented by the two-dimensional coordinate corresponds to projection. Projection can be realized by converting the two-dimensional coordinate, which represents the position in the image region 31, into the three-dimensional coordinate of real space using camera parameters such as an arrangement position, a posture, an angle of view, and lens distortion of the camera.

Figure 4:
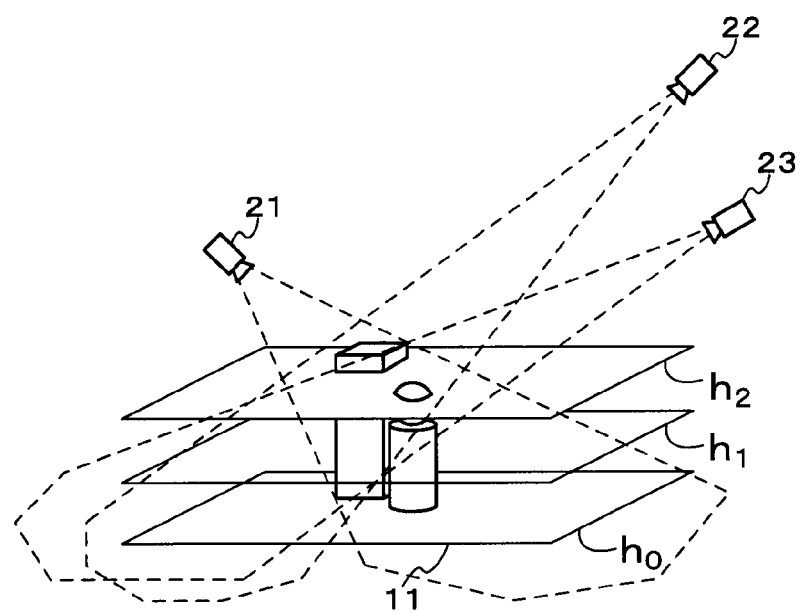
FIG. 4 It depicts a schematic view illustrating an example of a positional relationship between the position of each camera determined based on camera parameters and a monitoring domain.

The projecting unit 5 projects the image region 31 on each monitoring domain per camera. FIG. 4 depicts a schematic view illustrating an example of a positional relationship between a position of each camera determined based on camera parameters and a monitoring domain. For example, the projecting unit 5 projects the image region 31 (see FIG. 3) of the camera 21 on the monitoring domains $h_0$, $h_1$, and $h_2$. Similarly, the projecting unit 5 projects the image regions of the other cameras 22 and 23 on the monitoring domains $h_0$, $h_1$, and $h_2$.

Further, the projecting unit 5 refers to information of a position and a size of an obstacle upon projection, and determines whether the obstacle exists on a line connecting the camera position and a projection point on a monitoring domain. Furthermore, upon determining that the obstacle exists on the line connecting the camera position and the projection point on the monitoring domain, the projecting unit 5 determines that the projection point on this monitoring domain is a point at which the camera is blocked by the obstacle and cannot capture an image. Meanwhile, upon determining that the obstacle does not exist on the line connecting the camera position and the projection point on the monitoring domain, the projecting unit 5 determines that the projection point on this monitoring domain is a point at which the camera can capture an image without being blocked by the obstacle.

By making the determination as to the projection point on the monitoring domain, the projecting unit 5 specifies a field as a range an image of which the camera can capture without being blocked by the obstacle in the monitoring domain.

Further, the projecting unit 5 preferably superimposes and displays a range, in which the obstacle exists, on a monitoring domain on which an image region is projected. The range in which the obstacle exists may be represented by a specific color (a translucent color). Further, an outer periphery of the range in which the obstacle exists may be represented by a specific line type.

Figure 5:
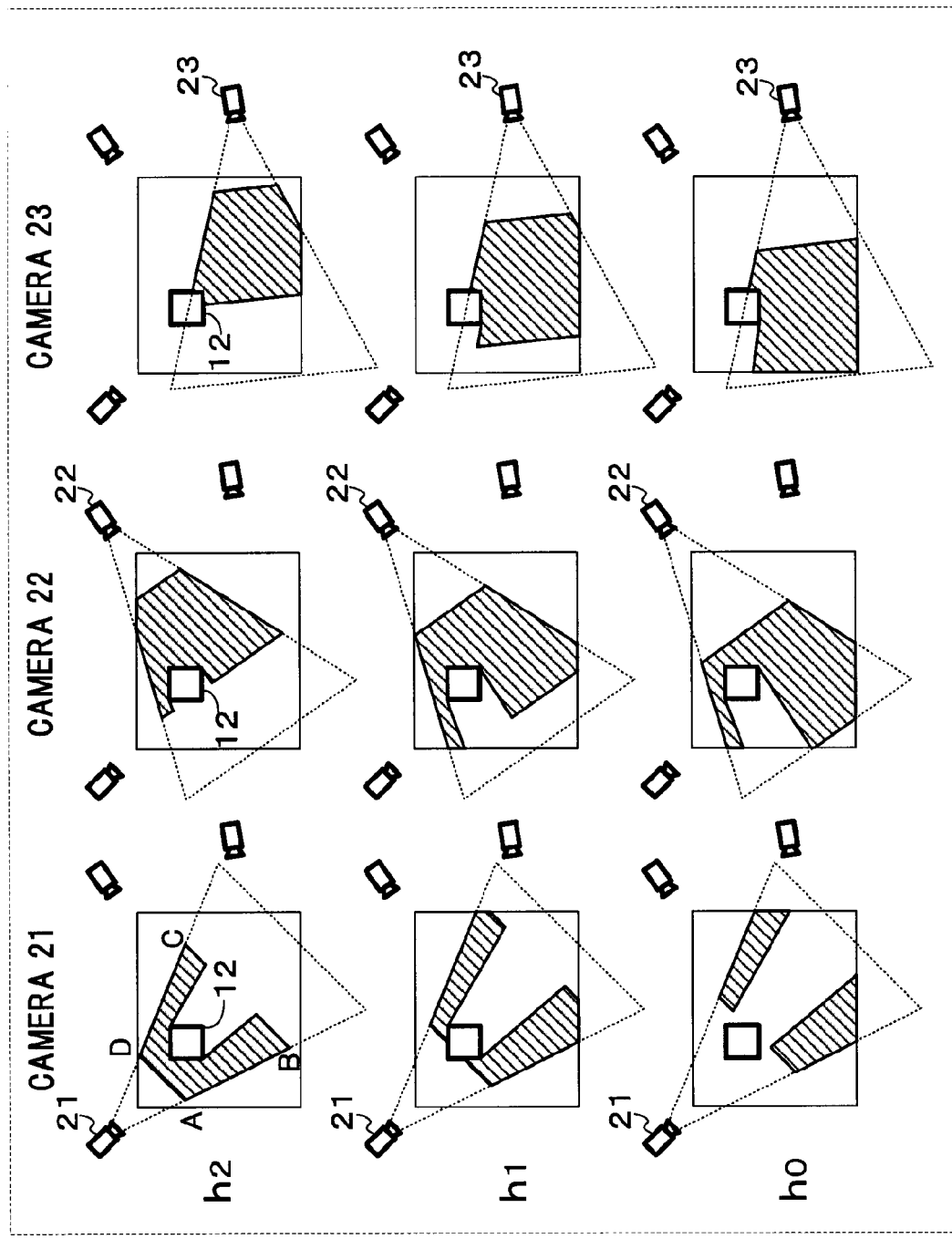
FIG. 5 It depicts an explanatory view illustrating a result obtained by projecting an image region of each camera illustrated in FIG. 4, on each monitoring domain.

FIG. 5 depicts an explanatory view illustrating a result obtained by projecting an image region of each camera illustrated in FIG. 4, on each monitoring domain. FIG. 5 illustrates a projection result related to the camera 21, a projection result related to the camera 22, and a projection result related to the camera 23 from a left column. Further, FIG. 5 illustrates a projection result related to the monitoring domain $h_2$, a projection result related to the monitoring domain $h_1$, and a projection result related to the monitoring domain $h_0$ from the top row.

A result of projecting an image region of the camera on a horizontal plane is a trapezoidal shape. For example, a result of projecting the image region of the camera 21 on the monitoring domain $h_2$ is a trapezoidal shape ABCD (see FIG. 5). The size of this trapezoid differs depending on the height of the monitoring domain. As a difference in height between the camera and the monitoring domain is greater, the trapezoidal shape which indicates the projection result is larger. Meanwhile, the projecting unit 5 does not include, in the projection result, a portion of this trapezoid that goes beyond the monitoring domain.

As described above, the projecting unit 5 preferably superimposes and displays the obstacle on the monitoring domain. In an example illustrated in FIG. 5, in each monitoring domain, a range in which the obstacle 12 exists is filled by white, and the outer periphery of this range is indicated by a solid line.

According to each projection result illustrated in FIG. 5, a range indicated by diagonal lines represents a field an image of which the camera can capture without being blocked by the obstacle 12. This field differs from camera to camera. Further, when focusing on one camera, the field differs depending on the height of a monitoring domain.

Furthermore, in each of the monitoring domains $h_0$ to $h_1$ illustrated in FIG. 5, a region other than the field and the obstacle is a range in which the camera is blocked by the obstacle and cannot capture an image, and a range which does not correspond to a projection destination of an image region. That is, a range other than a field in a monitoring domain is a range in which the camera cannot capture an image of a target to be monitored.

The integrating unit 6 integrates fields of cameras specified in respective monitoring domains.

According to the first exemplary embodiment, the integrating unit 6 extracts regions corresponding to fields in all monitoring domains $h_0$ to $h_2$ and obtains an extraction result as an integration result of the fields for each camera.

Figure 6:
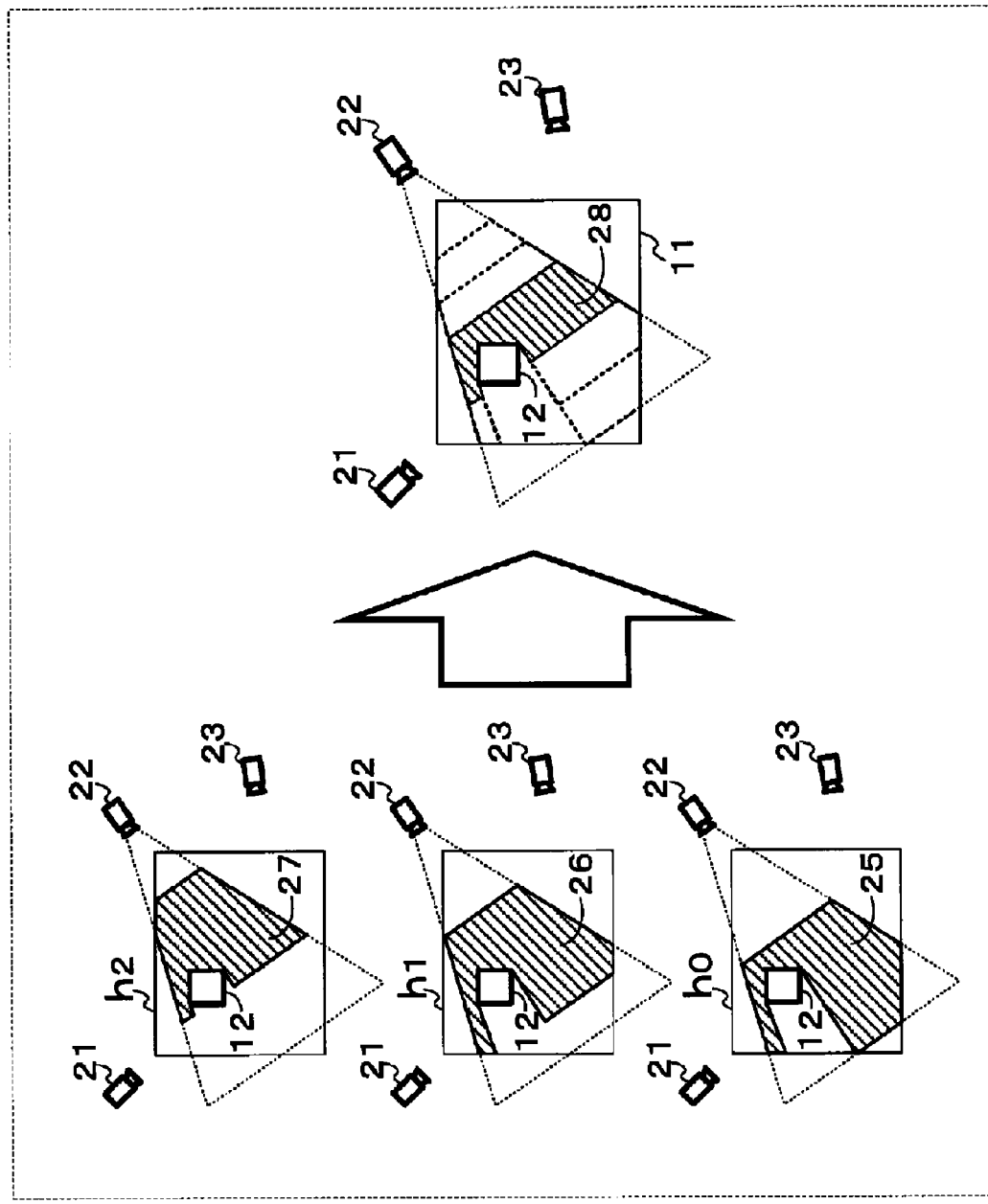
FIG. 6 It depicts an explanatory view schematically illustrating integration of fields according to the first exemplary embodiment.

FIG. 6 depicts an explanatory view schematically illustrating integration of fields according to the first exemplary embodiment. FIG. 6 illustrates integration of fields of the camera 22. A field 27 illustrated in FIG. 6 is a field in the monitoring domain $h_2$. Similarly, a field 26 is a field in the monitoring domain $h_1$ and a field 25 is a field in the monitoring domain $h_0$. The integrating unit 6 extracts a common region 28 in the fields 25, 26 and 27 in the monitoring domains $h_0$ to $h_2$, and determines this region 28 as an integration result of the fields in the monitoring domains.

The fields 25, 26 and 27 represent ranges in which, at the heights of the monitoring domains corresponding to these fields, the camera 22 can capture an image of a target to be monitored without being blocked by an obstacle. Hence, when a target to be monitored exists in the common region 28 (see FIG. 6) of the fields 25, 26 and 27 in the monitoring domains $h_0$ to $h_2$ of different heights, the camera 22 can capture an image of the vicinity of the lower end to the vicinity of the upper end of the target to be monitored. That is, the region 28, which is an integration result of the fields 25, 26 and 27, can be referred to as a region in which the camera 22 can capture an image of the entire target to be monitored.

The integrating unit 6 integrates the fields as described above per camera. Hence, according to the first exemplary embodiment, the integration result of fields can be obtained per camera.

The display control unit 7 causes a display apparatus (not illustrated) to display an integration result of fields obtained per camera. In addition, the field display system 1 may have a display apparatus.

The information registering unit 2, the monitoring domain determining unit 4, the projecting unit 5, the integrating unit 6, and the display control unit 7 are realized by, for example, a CPU of a computer which operates according to a field display program. In this case, the CPU only needs to read the field display program, and operate as the information registering unit 2, the monitoring domain determining unit 4, the projecting unit 5, the integrating unit 6, and the display control unit 7 according to this program. Further, the field display program may be recorded in a computer-readable recording medium. Furthermore, the information registering unit 2, the monitoring domain determining unit 4, the projecting unit 5, the integrating unit 6, and the display control unit 7 may be respectively realized by different hardware.

Figure 7:
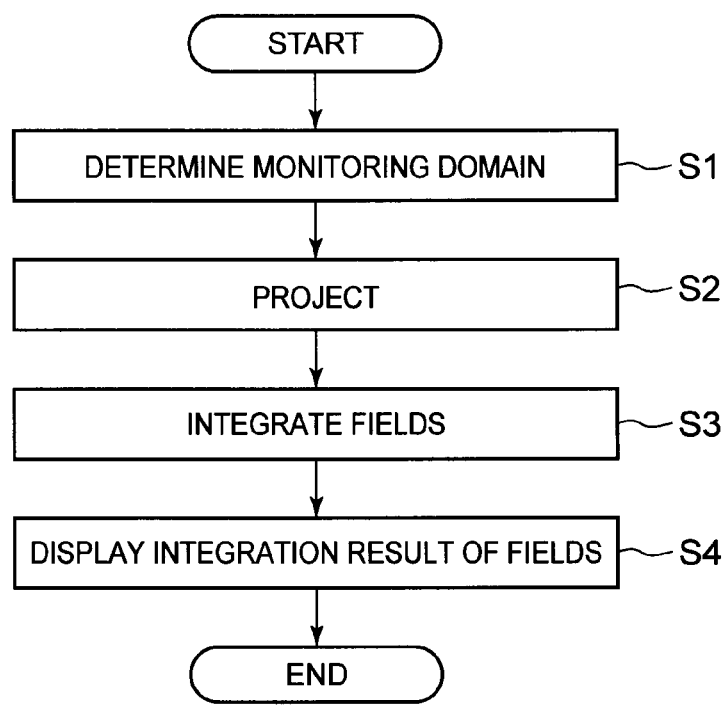
FIG. 7 It depicts a flowchart illustrating an example of steps of processing according to the first exemplary embodiment of the present invention.

Next, steps of processing according to the present exemplary embodiment will be described. FIG. 7 depicts a flowchart illustrating an example of steps of processing according to the first exemplary embodiment of the present invention. In addition, it is assumed that in the information memory unit 3, various pieces information such as camera parameters have been stored. First, the monitoring domain determining unit 4 refers to information which indicates a region to be monitored and information related to a target to be monitored, and determines a plurality of monitoring domains in a range from the vicinity of the lower end to the vicinity of the upper end of the target to be monitored (step S1). In addition, a plurality of monitoring domains may be determined in advance, and information on these monitoring domains may be stored in the information memory unit 3. In this case, step S1 may be skipped. Further, in this case, the field display system 1 may not include the monitoring domain determining unit 4.

After step S1, the projecting unit 5 projects an image region of an image captured by the camera, on each monitoring domain per camera (step S2). Further, in step S2, the projecting unit 5 specifies the region corresponding to a field in each monitoring domain. Furthermore, preferably, the projecting unit 5 also superimposes the range in which an obstacle exists, on each monitoring domain.

Next, the integrating unit 6 integrates fields in the monitoring domains (step S3). According to the present exemplary embodiment, the integrating unit 6 extracts, as an integration result, a common region of the fields represented in the respective monitoring domains per camera.

Figure 8:
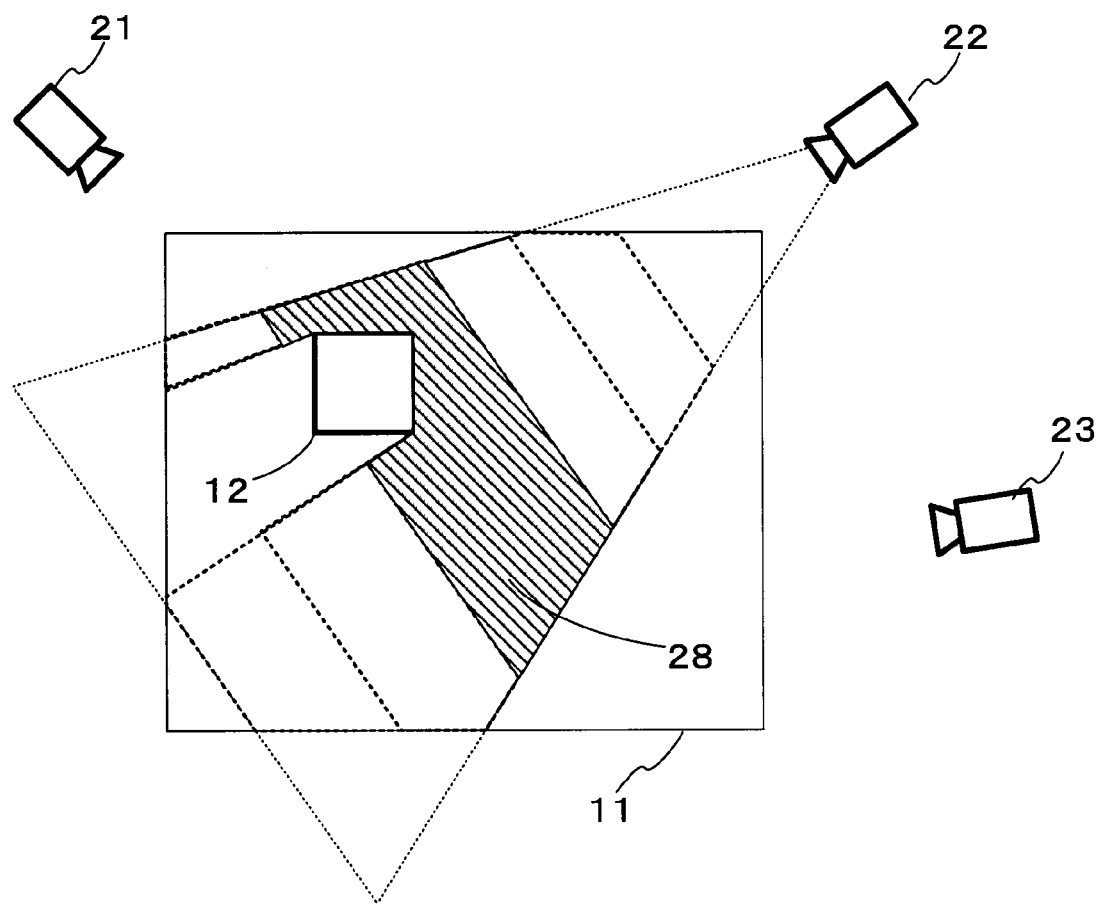
FIG. 8 It depicts an explanatory view illustrating a display example of an integration result of fields according to the first exemplary embodiment.

The display control unit 7 causes the display apparatus (not illustrated) to display the integration result of the fields obtained per camera (step S4). FIG. 8 depicts an explanatory view illustrating a display example of an integration result of fields according to the first exemplary embodiment. For example, the display control unit 7 causes the display apparatus to display a region 28, obtained by integrating fields of the camera 22, together with the region to be monitored 11 as illustrated in FIG. 8. Further, the display control unit 7 causes the display apparatus to also display the range in which the obstacle 12 superimposed by the projecting unit 5 exists. Similarly, the display control unit 7 causes the display apparatus to display integration results of fields of other cameras.

According to the first exemplary embodiment, a common region of fields in monitoring domains of different heights is extracted and the display apparatus is caused to display the common region per camera. Consequently, it is possible to present to a user a range in a region to be monitored in which it is possible to capture an image of the vicinity of a lower end to the vicinity of an upper end of a target to be monitored (for example, a person). Therefore, the user can easily learn the range in the region to be monitored in which the camera can capture an image of the entire target to be monitored. Further, by changing camera parameters and checking a change of this range, it is easier to adjust, for example, a position, a posture and an angle of view of the camera to maximize this range.

In addition, according to the first exemplary embodiment, the number of cameras may be one.

Second Exemplary Embodiment

A field display system according to a second exemplary embodiment visualizes not only a range in which an entire target to be monitored can be seen but also to what degree a portion of the entire target to be monitored (for example, the entirety of a person) can be captured by the camera in the region to be monitored to present to the user.

Figure 9:
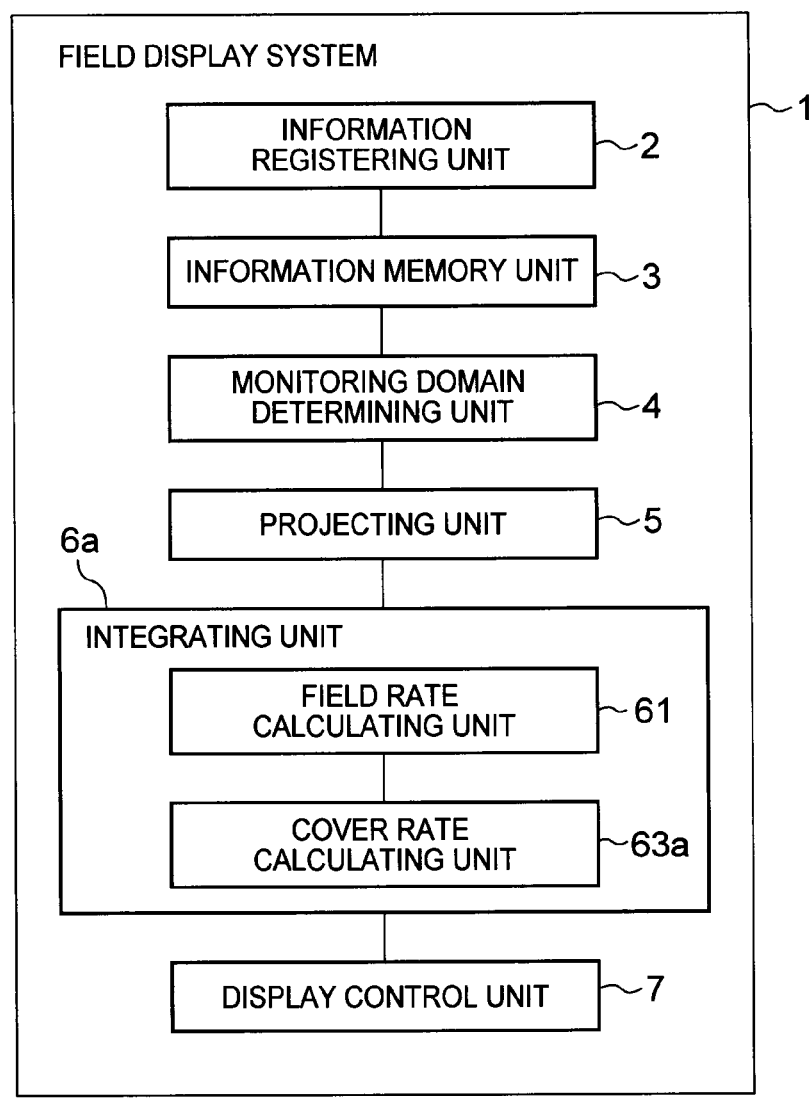
FIG. 9 It depicts a block diagram illustrating an exemplary configuration of a field display system according to a second exemplary embodiment of the present invention.

FIG. 9 depicts a block diagram illustrating an exemplary configuration of the field display system according to the second exemplary embodiment of the present invention. The same components as those in the first exemplary embodiment will be assigned the same reference numerals as those in FIG. 1, and will not be described. The field display system according to the second exemplary embodiment includes an integrating unit 6a (see FIG. 9) instead of the integrating unit 6 (see FIG. 1) according to the first exemplary embodiment. The integrating unit 6a includes a field rate calculating unit 61 and a cover rate calculating unit 63a.

The field rate calculating unit 61 calculates a field rate per position outside a range in which an obstacle exists in a region to be monitored 11 (see FIG. 2). Further, the field rate calculating unit 61 calculates the field rate per camera.

The field rate refers to a ratio of the number of monitoring domains, focused positions of which belong to fields, to the total number of monitoring domains. In the example illustrated in FIG. 2, the total number of monitoring domains is "3". Further, focusing on, for example, a given position in the region to be monitored 11, although this position belongs to the fields in two monitoring domains $h_2$ and $h_1$, the position does not belong to the field in the remaining monitoring domain $h_0$. In this case, the field rate calculating unit 61 calculates the field rate of the focused position as "2/3". The field rate calculating unit 61 calculates a field rate as described above per position outside the range in which an obstacle exists. Meanwhile, the field rate calculating unit 61 does not need to calculate a field rate per densely continuous position. For example, the field rate calculating unit 61 may divide the region to be monitored 11 (except the range in which the obstacle exists) per fixed range, determine a representative position from each divided area, and calculate the field rate at this representative position. Further, the field rate calculating unit 61 may determine this field rate as a field rate of a divided area to which the representative position belongs.

The field rate calculating unit 61 calculates a field rate per position in the region to be monitored 11 (except the range in which the obstacle exists), and then specifies a region, corresponding to each field rate, in the region to be monitored 11. The region of each field rate specified in this way is an integration result of fields according to the second exemplary embodiment.

Figure 10:
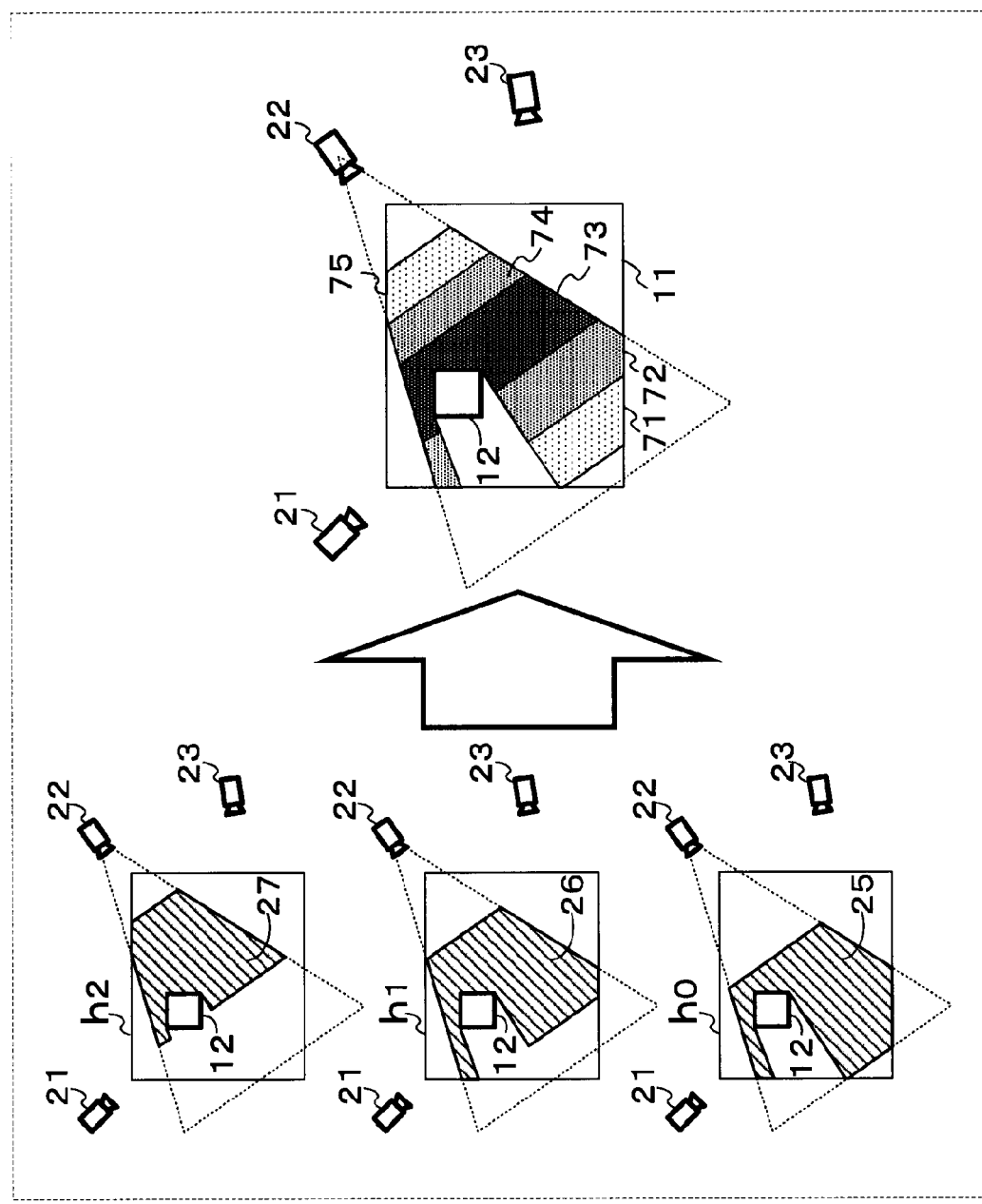
FIG. 10 It depicts an explanatory view schematically illustrating integration of fields according to the second exemplary embodiment.

FIG. 10 depicts an explanatory view schematically illustrating integration of fields according to the second exemplary embodiment. FIG. 10 illustrates integration of fields of the camera 22. The fields 25 to 27 illustrated in FIG. 10 are the same as the fields 25 to 27 illustrated in FIG. 6, and will not be described. The field rate calculating unit 61 calculates a field rate per position in the region to be monitored 11 (except a range in which an obstacle exists). In this example, there are three monitoring domains, and the field rates are calculated as "0", "1/3", "2/3", and "3/3=1". The field rate calculating unit 61 specifies a region, corresponding to each of these field rates, in the region to be monitored 11. In the example illustrated in FIG. 10, a region 73 is a region of a field rate "3/3=1". Further, regions 72 and 74 are regions of a field rate "2/3". Furthermore, regions 71 and 75 are regions of a field rate "1/3". The other regions are regions of a field rate "0".

Note that a field rate is not calculated for a range in which the obstacle 12 exists. The field rate calculating unit 61 preferably superimposes the range in which the obstacle 12 exists, on the region to be monitored 11. The range in which the obstacle exists may be represented by a specific color (a translucent color). Further, an outer periphery of the range in which the obstacle exists may be represented by a specific line type. This is the same as in the first exemplary embodiment. Further, the same applies to the following exemplary embodiments.

The cover rate calculating unit 63a calculates a cover rate per camera. The cover rate is a ratio of a sum of calculated field rates to the number of positions, field rates of which have been calculated in the region to be monitored 11. That is, the cover rate calculating unit 63a calculates a cover rate by calculating following equation (1).

[Math. 1]

$$\text{Cover rate} = \frac{\text{Sum of calculated field rates}}{\text{Number of positions at which field rates have been calculated in region to be monitored}} \quad \text{Equation (1)}$$

The cover rate can be a ratio of a region in which a target to be monitored can be monitored, to the region to be monitored 11.

Although the cover rate calculated according to equation (1) in the second exemplary embodiment can be referred to as "a cover rate based on field rates", this cover rate is simply referred to as a "cover rate" for ease of description.

Further, the cover rate calculating unit 63a may add field rates in a specified numerical value range as a numerator on the right side of equation (1) when calculating the cover rate by calculating equation (1). That is, the cover rate calculating unit 63a may add only field rates in the specified numerical value range upon calculation of the numerator on the right side of equation (1), ignore field rates outside this numerical value range (for example, regard the field rates as 0) and calculate the cover rate according to equation (1). A method of specifying this numerical value range is not limited in particular. For example, the numerical value range may be specified by the user inputting the numerical value range of a field rate to the field display system 1.

Further, the display control unit 7 causes the display apparatus to also display a cover rate together with an integration result of fields.

The integrating unit 6a (more specifically, the field rate calculating unit 61 and the cover rate calculating unit 63a) is realized by, for example, the CPU which operates according to the field display program.

Figure 11:
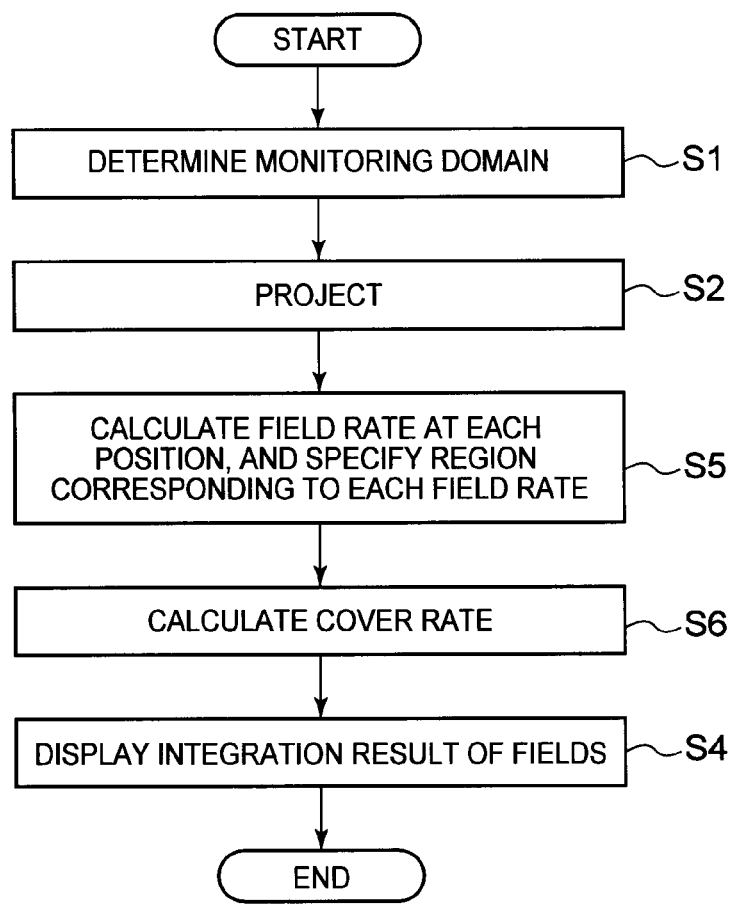
FIG. 11 It depicts a flowchart illustrating an example of steps of processing according to the second exemplary embodiment.

FIG. 11 depicts a flowchart illustrating an example of steps of processing according to the second exemplary embodiment. Processing in steps S1 and S2 is the same as that in steps S1 and S2 according to the first exemplary embodiment. According to the second exemplary embodiment, after step S2, the field rate calculating unit 61 calculates a field rate per position outside a range in which an obstacle exists, in a region to be monitored 11. Further, the field rate calculating unit 61 specifies a region corresponding to each of these calculated field rates in the region to be monitored 11 (step S5). The field rate calculating unit 61 performs this processing per camera. A result in step S5 is an integration result of fields according to the second exemplary embodiment.

Next, the cover rate calculating unit 63a calculates a cover rate by calculating equation (1) (step S6). The cover rate calculating unit 63a calculates a cover rate per camera.

Figure 12:
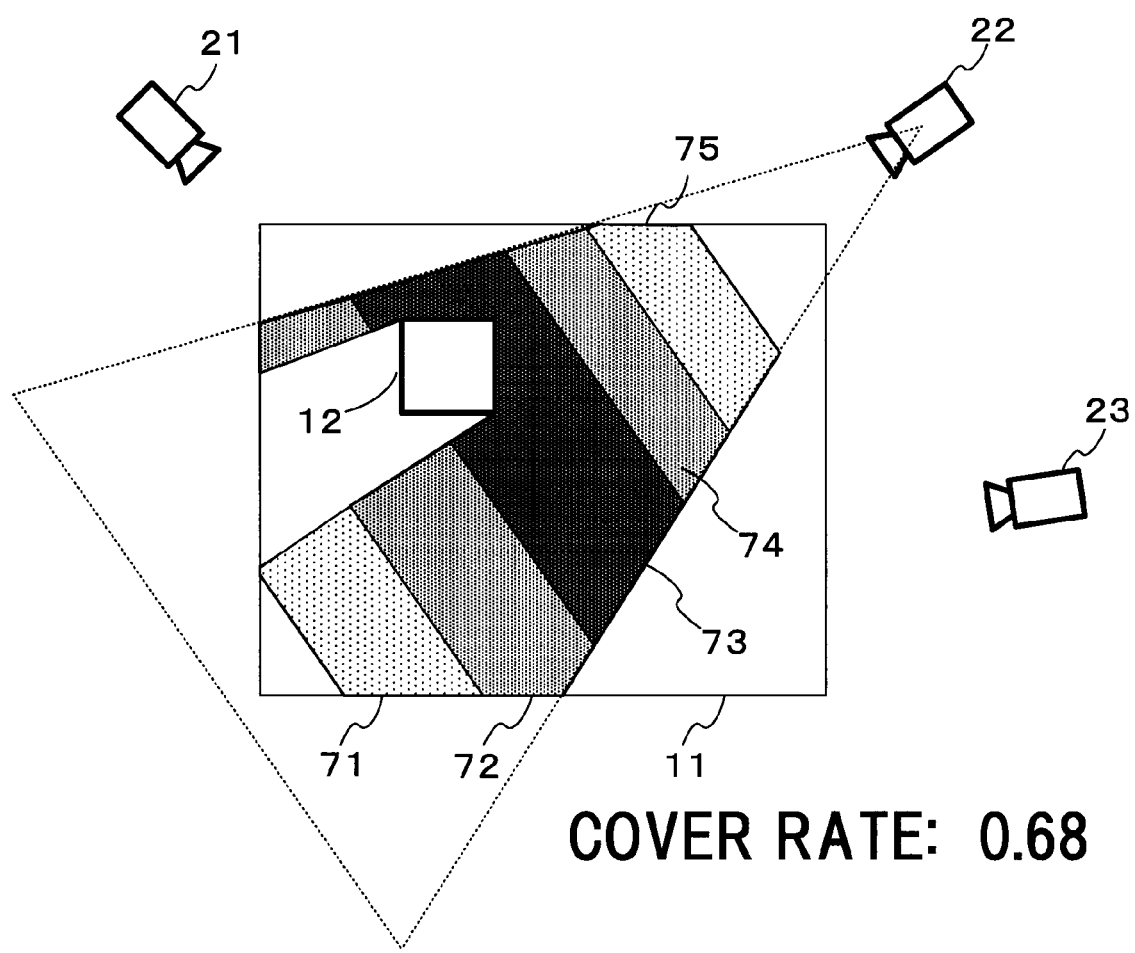
FIG. 12 It depicts an explanatory view illustrating a display example of an integration result of fields according to the second exemplary embodiment.

Next, the display control unit 7 causes the display apparatus (not illustrated) to display the integration result of the fields obtained per camera (step S4). FIG. 12 depicts an explanatory view illustrating a display example of an integration result of fields according to the second exemplary embodiment. For example, as illustrated in FIG. 12, the display control unit 7 causes the display apparatus to display each region specified as a region corresponding to each field rate of the camera 22 according to a mode which supports this field rate. Examples of displaying each region according to a mode which supports a field rate include distinguishing and displaying each region with a color, a pattern and brightness associated with a field rate. In addition, when a region is distinguished and displayed, a region may be distinguished based on matters other than a color, a pattern and brightness. The same applies to the other exemplary embodiments. In the example illustrated in FIG. 12, patterns are distinguished among the region 73 of the field rate "3/3=1", the regions 72 and 74 of the field rate "2/3", the regions 71 and 75 of the field rate "1/3", and the other regions (the regions of the field rate "0"). Further, the display control unit 7 causes the display apparatus to also display the range in which the superimposed obstacle 12 exists.

Furthermore, the display control unit 7 causes the display apparatus to also display a cover rate as illustrated in FIG. 12. Note that, although FIG. 12 illustrates an example of directly displaying a cover rate, a method of displaying a cover rate is not limited in particular. For example, a cover rate may be displayed by means of a graph which shows a difference between cover rates of respective cameras, where the horizontal axis may indicate an identification number of each camera and the vertical axis may indicate the cover rate.

According to the second exemplary embodiment, the display apparatus displays a region corresponding to each field rate with a color, a pattern and brightness associated with the field rate. Further, this means that, as the field rate is higher, an image of a larger portion of a target to be monitored (for example, a person) can be captured. Consequently, it is possible to intelligibly present to a user a range in which a camera can capture an image of the entire target to be monitored or a certain part or more of the target to be monitored. Consequently, the user can easily learn the range in the region to be monitored in which the camera can capture an image of the entirety or most part of the target to be monitored. Further, by changing information related to the camera and checking a change of this range, it is easier to adjust, for example, a position, a posture and an angle of view of the camera to maximize this range.

Furthermore, by also displaying a cover rate, it is possible to present to the user a ratio of a region in which the camera can monitor the target to be monitored, to the region to be monitored 11.

Next, a modified example of the second exemplary embodiment will be described. In the second exemplary embodiment, display of a cover rate may be skipped. In this case, the field display system 1 according to the second exemplary embodiment may not include the cover rate calculating unit 63a, and may not execute step S6 (see FIG. 11).

Further, in the second exemplary embodiment, in step S4, the display control unit 7 may cause the display apparatus to highlight a region corresponding to a field rate falling within a specified numerical value range. A method of specifying this numerical value range is not limited in particular. The user may input, to the field display system 1, a numerical value range of a field rate corresponding to a region to be highlighted, and the display control unit 7 may cause the display apparatus to highlight a region corresponding to a field rate falling within the numerical value range specified by the user.

Figure 13:
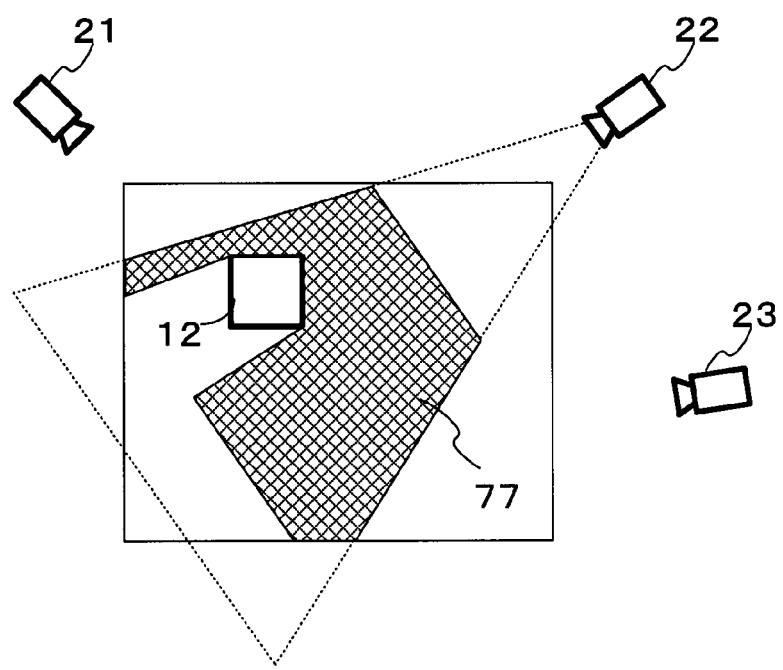
FIG. 13 It depicts an explanatory view illustrating an example of highlighting a region corresponding to a field rate falling within a specific numerical value range.

FIG. 13 depicts an explanatory view illustrating an example of highlighting a region corresponding to a field rate falling within a specific numerical value range. For example, as illustrated in FIG. 12, the display control unit 7 causes the display apparatus to display each region corresponding to each field rate. Further, it is assumed that, as the numerical value range of the field rate corresponding to a region to be highlighted, a range of "2/3 or more and 1 or less" is specified. In this case, the region corresponding to the field rate in the range of "2/3 or more and 1 or less" includes the regions 72 and 74 of the field rate "2/3" and the region 73 of the field rate "1". Hence, as illustrated in FIG. 13, the display control unit 7 highlights a region obtained by combining the regions 72 to 74 illustrated in FIG. 12. The region 77 highlighted in an example in FIG. 13 is a region obtained by combining the regions 72 to 74. Thus, in this modified example, the display control unit 7 causes the display apparatus to highlight a specified region, so that it is possible to explicitly visualize an effective field in which an image of a large portion of a target to be monitored can be reliably captured. Further, when only "1" is specified as a numerical value range of the field rate, a region to be highlighted is the same as an integration result of fields displayed in the first exemplary embodiment.

Figure 14:
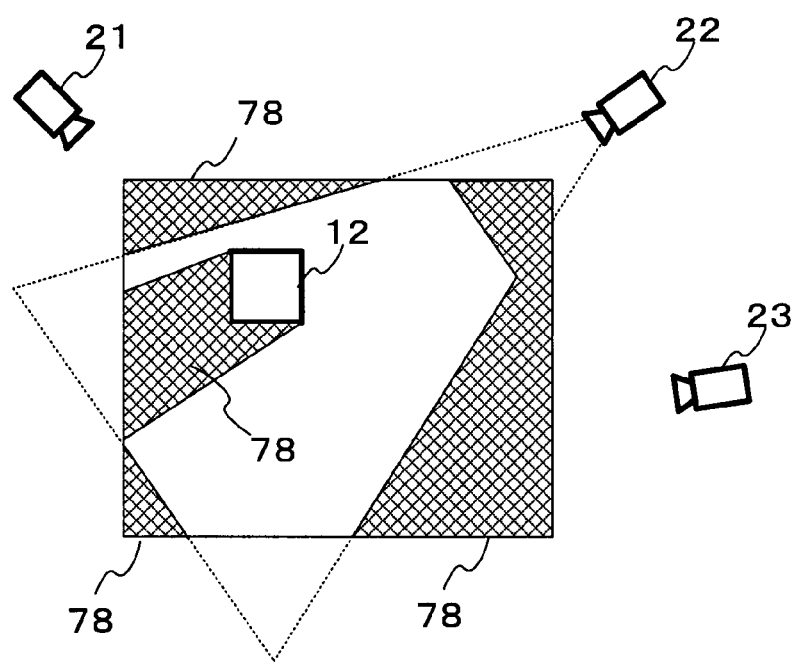
FIG. 14 It depicts an explanatory view illustrating another example of highlighting.

Furthermore, only "0" may be specified as a numerical value range of a field rate corresponding to a region to be highlighted. FIG. 14 depicts an explanatory view illustrating an example of a region to be highlighted in this case. That is, the region 78 highlighted in the example illustrated in FIG. 14 is a range corresponding to the field rate "0", in other words, a range corresponding to a blind angle of the camera. Thus, by specifying "0" as a numerical value range, the user can visually and clearly check the range corresponding to the blind angle of the camera.

Note that FIGS. 13 and 14 illustrate cases where regions (that is, regions which are not highlighted) corresponding to field rates outside the specified numerical value range are uniformly displayed in a monochromatic manner. Further, as illustrated in FIGS. 13 and 14, when performing highlighting, the display control unit 7 preferably causes the display apparatus to also display a range in which the obstacle 12 exists.

Third Exemplary Embodiment

Figure 15:
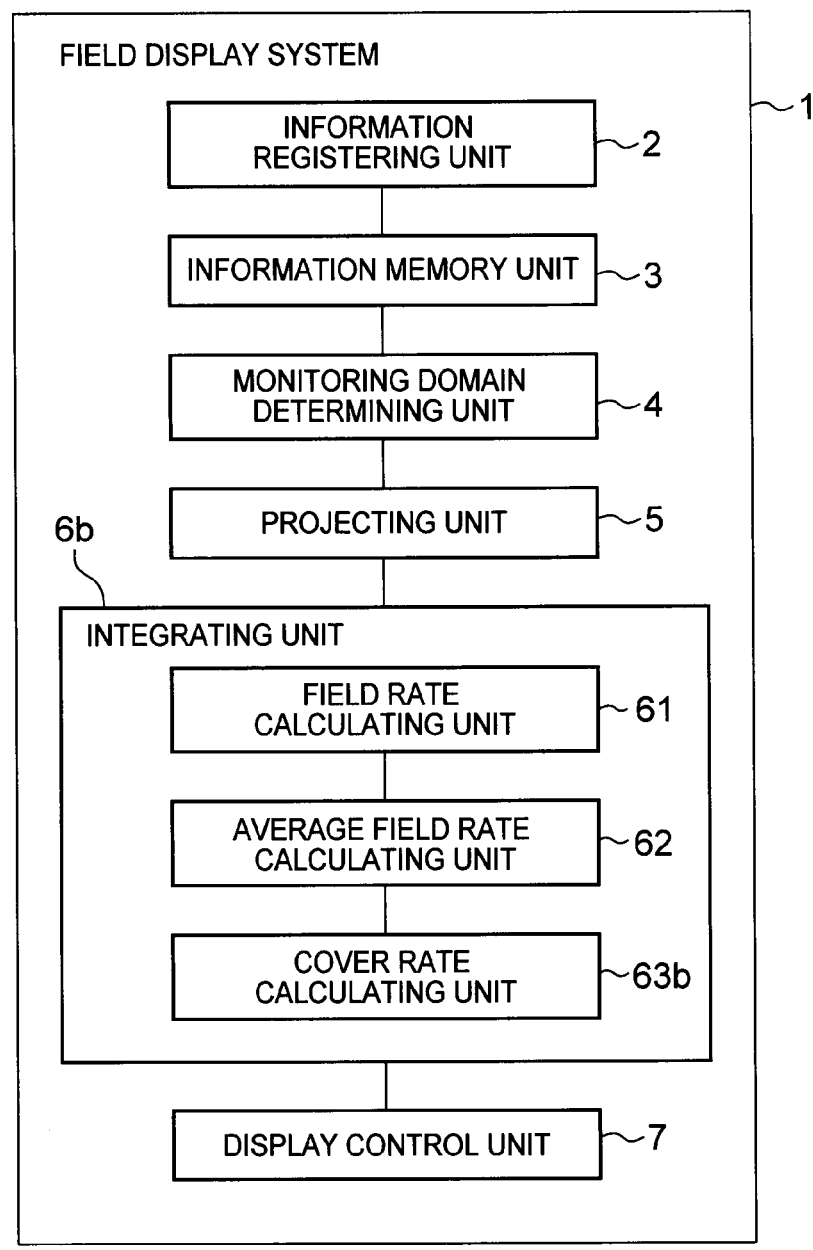
FIG. 15 It depicts a block diagram illustrating an exemplary configuration of a field display system according to a third exemplary embodiment of the present invention.

FIG. 15 depicts a block diagram illustrating an exemplary configuration of a field display system according to a third exemplary embodiment of the present invention. The same components as those in the first and second exemplary embodiments will be assigned the same reference numerals as those in FIGS. 1 and 9, and will not be described. The field display system according to the third exemplary embodiment includes an integrating unit 6b (see FIG. 15) instead of the integrating unit 6 (see FIG. 1) according to the first exemplary embodiment. The integrating unit 6b includes a field rate calculating unit 61, an average field rate calculating unit 62, and a cover rate calculating unit 63b.

The field rate calculating unit 61 is the same as the field rate calculating unit 61 according to the second exemplary embodiment.

The average field rate calculating unit 62 calculates an average field rate per position outside a range in which an obstacle exists, in a region to be monitored 11 (see FIG. 2).

As described above, the field rate calculating unit 61 does not need to calculate a field rate per densely continuous position. The average field rate calculating unit 62 does not need to calculate an average field rate per densely continuous position, either. For example, the average field rate calculating unit 62 may divide the region to be monitored 11 (except the range in which the obstacle exists) per fixed range, determine a representative position from each divided area, and calculate the average field rate at this representative position. Further, the average field rate calculating unit 62 may determine this average field rate as an average field rate of the divided areas to which the representative positions belong. Furthermore, the average field rate calculating unit 62 only needs to calculate the average field rate of the positions, the field rates of which have been calculated by the field rate calculating unit 61. That is, positions to calculate the average field rate are the same as the positions, the field rates of which are calculated by the field rate calculating unit 61.

Meanwhile, the average field rate is an average value of field rates of predetermined top rank orders out of field rates calculated per camera by the field rate calculating unit 61 for focused positions in the region to be monitored 11 (except the range in which the obstacle exists). For example, for a position P in the region to be monitored 11 (except the range in which the obstacle exists), field rates are calculated per individual camera. Further, top n rank orders from the first place to the n-th place are determined as rank orders of calculation targets of the average field rate. In this case, an average value of n field rates from the highest field rate to the n-th highest field rate among the field rates at this position P is the average field rate. Therefore, the average field rate calculating unit 62 only needs to calculate, as the average field rate at the position P, the average value of the n field rates from the highest field rate to the n-th highest field rate among the field rates at this position P. Note that a value of the above "n" is determined in advance.

Figure 16:
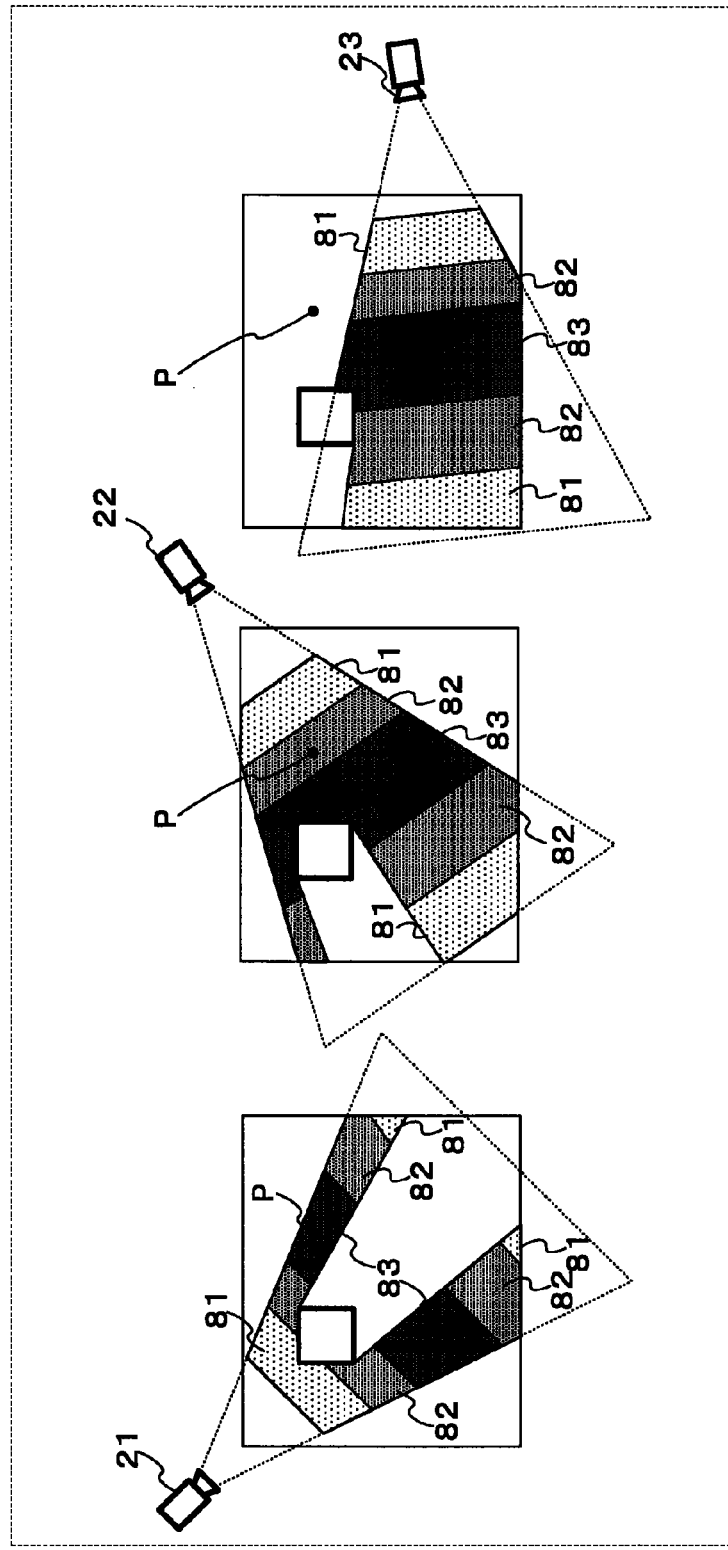
FIG. 16 It depicts an explanatory view illustrating a calculation example of an average field rate.

FIG. 16 depicts an explanatory view illustrating a calculation example of an average field rate. In the following description, similar to a case illustrated in FIG. 2, three monitoring domains $h_0$ to $h_2$ are determined. Further, the above n is "2". That is, a case will be described as an example where the average field rate calculating unit 62 calculates, as an average field rate, an average value of the top two field rates among the field rates calculated per camera for one position. FIG. 16 illustrates, from the left side, a region per field rate determined by the field rate calculating unit 61 for the camera 21, a region per field rate determined by the field rate calculating unit 61 for the camera 22, and a region per field rate determined by the field rate calculating unit 61 for the camera 23. Further, in FIG. 16, a region of a field rate "1/3" is assigned a reference numeral "81". Furthermore, a region of a field rate "2/3" is assigned a reference numeral "82". Still further, a region of a field rate "3/3=1" is assigned a reference numeral "83".

Focusing upon the position P illustrated in FIG. 16, the field rate calculated by the field rate calculating unit 61 for the camera 21 is "1". Further, the field rate calculated by the field rate calculating unit 61 for the camera 22 is "2/3". Furthermore, the field rate calculated by the field rate calculating unit 61 for the camera 23 is "0". Hence, the average field rate calculating unit 62 only needs to calculate, as the average field rate at the position P, an average value of the top two field rates "1" and "2/3" out of the three field rates "1", "2/3" and "0" calculated per camera for the position P. In this example, the average field rate of the position P is "5/6".

The average field rate calculating unit 62 calculates an average field rate likewise for each of the other positions in the region to be monitored 11 (except a range in which an obstacle exists).

Further, the average field rate calculating unit 62 specifies a region corresponding to each average field rate in the region to be monitored 11. The region of each average field rate specified in this way is an integration result of fields according to the third exemplary embodiment.

The cover rate calculating unit 63b calculates a cover rate. Meanwhile, the cover rate according to the third exemplary embodiment is a ratio of a sum of calculated average field rates to the number of positions, field rates of which have been calculated in the region to be monitored 11. That is, the cover rate calculating unit 63b calculates a cover rate by calculating following equation (2).

[Math. 2]

$$\text{Cover rate} = \frac{\text{Sum of calculated average field rates}}{\text{Number of positions at which field rates have been calculated in region to be monitored}} \quad \text{Equation (2)}$$

In addition, an average field rate calculation position is the same as the position the field rate of which is calculated by the field rate calculating unit 61, and the denominator on the right side of equation (2) may be "the number of positions an average field rate of which has been calculated in the region to be monitored". Even in this case, a calculation result of the cover rate is the same.

Although the cover rate calculated according to equation (2) in the third exemplary embodiment can be referred to as "a cover rate based on average field rates", this cover rate is simply referred to as a "cover rate" for ease of description.

In the second exemplary embodiment, a cover rate (a cover rate based on the field rate) is calculated per camera. Meanwhile, the number of values of a calculated cover rate (a cover rate based on an average field rate) according to the third exemplary embodiment is one irrespective of the number of cameras. The cover rate according to the third exemplary embodiment can be a ratio of a region in which a target to be monitored can be monitored, to the region to be monitored 11 in a case where a plurality of cameras is taken into account.

Further, the cover rate calculating unit 63b may add average field rates in a specified numerical value range in a numerator on the right side of equation (2) when calculating the cover rate by calculating equation (2). That is, the cover rate calculating unit 63b may add only average field rates in the specified numerical value range upon calculation of the numerator on the right side of equation (2), ignore average field rates outside this numerical value range (for example, regard the average field rates as 0) and calculate the cover rate according to equation (2). Similar to the second exemplary embodiment, a method of specifying this numerical value range is not limited in particular.

The display control unit 7 causes the display apparatus to display an integration result of fields and a cover rate.

The integrating unit 6b (more specifically, the field rate calculating unit 61, the average field rate calculating unit 62, and the cover rate calculating unit 63b) is realized by, for example, the CPU which operates according to the field display program.

Figure 17:
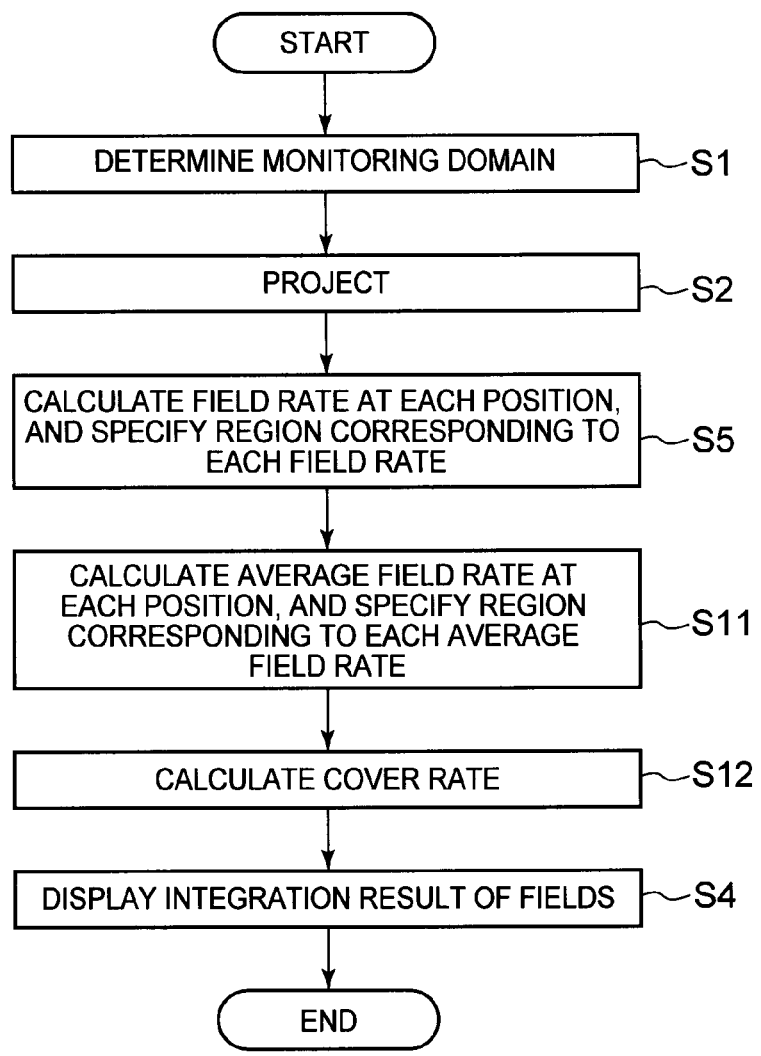
FIG. 17 It depicts a flowchart illustrating an example of steps of processing according to the third exemplary embodiment.

FIG. 17 depicts a flowchart illustrating an example of steps of processing according to the third exemplary embodiment. Steps S1, S2 and S5 are the same as steps S1, S2 and S5 (see FIG. 11) in the second exemplary embodiment, and will not be described.

After S5, the average field rate calculating unit 62 calculates an average field rate per position outside a range in which an obstacle exists, in the region to be monitored 11. Further, the average field rate calculating unit 62 specifies a region corresponding to each calculated average field rate in the region to be monitored 11 (step S11). A result in step S11 is an integration result of fields according to the third exemplary embodiment.

Next, the cover rate calculating unit 63b calculates a cover rate by calculating equation (2) (step S12).

Next, the display control unit 7 causes the display apparatus (not illustrated) to display the integration result of the fields (step S4). In the third exemplary embodiment, the display control unit 7 causes the display apparatus to display each region, specified in step S11 as a region corresponding to each average field rate, according to a mode which supports this average field rate. Displaying each region according to a mode which supports an average field rate includes, for example, distinguishing and displaying each region with a color, a pattern and brightness associated with the average field rate. The display control unit 7 causes the display apparatus to display each region corresponding to each average field rate in the region to be monitored according to a mode which supports this average field rate. Hence, a display format of an integration result according to the third exemplary embodiment is the same as the display format (FIG. 12) of an integration result according to the second exemplary embodiment. Meanwhile, in the third exemplary embodiment, each region is determined based on the average field rate, and therefore an individual region is narrower than an individual region displayed in the second exemplary embodiment. Further, although an integration result is displayed per camera in the second exemplary embodiment, one integration result is displayed irrespective of the number of cameras in the third exemplary embodiment. In addition, the display control unit 7 causes the display apparatus to also display the range in which the superimposed obstacle exists.

Further, the display control unit 7 causes the display apparatus to also display the cover rate calculated in step S12. In the third exemplary embodiment, one value of the cover rate is calculated irrespective of the number of cameras. The display control unit 7 only needs to cause the display apparatus to display this cover rate and an integration result of fields.

In the third exemplary embodiment, the display apparatus displays a region corresponding to each average field rate with a color, a pattern and brightness associated with the average field rate. Further, this means that, as the average field rate is higher, an image of a larger portion of a target to be monitored (for example, a person) can be captured. Consequently, it is possible to intelligibly present to a user a range in which a camera can capture an image of the entire target to be monitored or a certain part or more of the target to be monitored. In the third exemplary embodiment in particular, an average value (average field rate) of a predetermined number of top field rates among field rates calculated per camera is calculated, and each region is displayed based on this average field rate. Consequently, it is possible to intelligibly present to the user a range in which the camera can capture an image of the entire target to be monitored or a certain part or more of the target to be monitored by taking into account a plurality of cameras. As in the second exemplary embodiment, the user can easily learn the range in the region to be monitored in which the camera can capture an image of the entire target to be monitored or a large portion thereof. Further, by changing information related to the camera and checking a change of this range, it is easier to adjust, for example, a position, a posture and an angle of view of the camera to maximize this range.

Furthermore, according to the third exemplary embodiment, by also displaying a cover rate calculated according to equation (2), it is possible to present to the user a ratio of a region in which the camera can monitor the target to be monitored, to the region to be monitored 11 in a case where a plurality of cameras is taken into account.

Next, a modified example of the third exemplary embodiment will be described. In the third exemplary embodiment, display of a cover rate may be skipped. In this case, the field display system 1 according to the third exemplary embodiment may not include the cover rate calculating unit 63b, and may not execute step S12 (see FIG. 17).

Further, in the third exemplary embodiment, in step S4, the display control unit 7 may cause the display apparatus to highlight a region corresponding to an average field rate falling within a specified numerical value range. A method of specifying this numerical value range is not limited in particular. For example, the user may input, to the field display system 1, a numerical value range of an average field rate corresponding to a region to be highlighted and the display control unit 7 may cause the display apparatus to highlight the region corresponding to the average field rate falling within the numerical value range specified by the user. An operation of this display control unit 7 is the same as an operation (an operation of causing the display apparatus to highlight the region corresponding to the field rate falling within the specified numerical value range) described as one modified example according to the second exemplary embodiment. According to the present modified example, it is possible to intelligibly present to the user a region corresponding to an average field rate falling within the specified numerical value range.

Further, in the third exemplary embodiment, in step S4, the display control unit 7 may receive user's specifying of a camera, and cause the display apparatus to highlight a range which settles in an image of this camera in an integration result of the fields. According to the present modified example, it is possible to intelligibly present to the user a range which settles in the image of the specified camera.

Fourth Exemplary Embodiment

Figure 18:
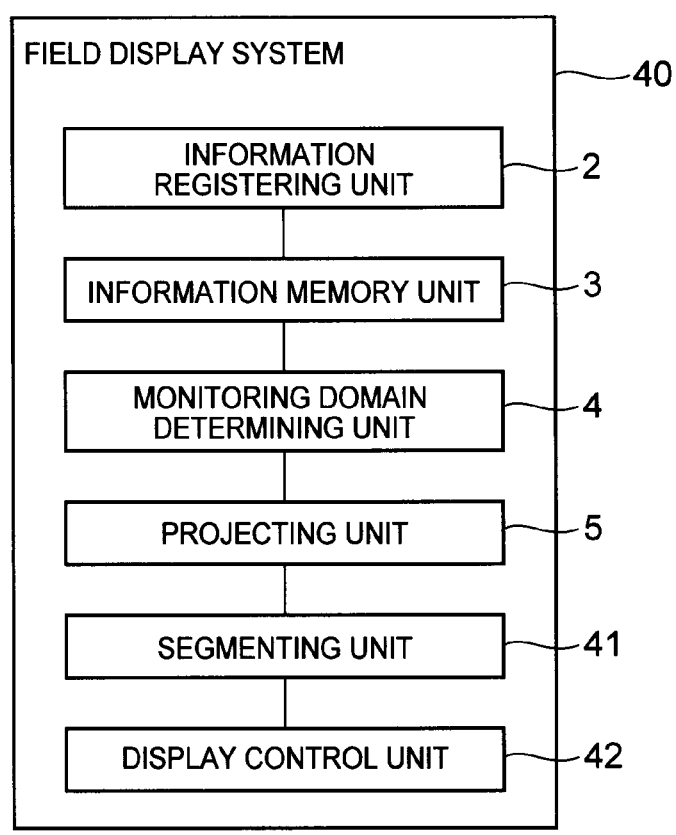
FIG. 18 It depicts a block diagram illustrating an exemplary configuration of a field display system according to a fourth exemplary embodiment of the present invention.

FIG. 18 depicts a block diagram illustrating an exemplary configuration of a field display system according to a fourth exemplary embodiment of the present invention. A field display system 40 according to the fourth exemplary embodiment includes an information registering unit 2, an information memory unit 3, a monitoring domain determining unit 4, a projecting unit 5, a segmenting unit 41, and a display control unit 42. The information registering unit 2, the information memory unit 3, the monitoring domain determining unit 4, and the projecting unit 5 are the same as those in the first to third exemplary embodiments, and will not be described.

The segmenting unit 41 segments each monitoring domain based on how many fields of cameras each monitoring domain corresponds to. It is assumed that three monitoring domains $h_0$ to $h_2$ illustrated in FIG. 2 are determined, and camera parameters of three cameras 21 to 23 (see FIG. 4) are stored in the information memory unit 3. In this case, the segmenting unit 41 segments the monitoring domain $h_0$ into a region corresponding to the fields of the three cameras, a region corresponding to the fields of the two cameras, a region corresponding to the field of one camera, and a region which does not correspond to a field of any camera. The segmenting unit 41 segments the monitoring domains $h_1$ and $h_2$ in the same manner.

The display control unit 42 causes a display apparatus (not illustrated) to display each monitoring domain to display a region segmented in an individual monitoring domain according to a mode which supports the number of cameras which include the region in the fields. For example, the display control unit 42 distinguishes among the region corresponding to the fields of the three cameras, the region corresponding to the fields of the two cameras, the region corresponding to the field of one camera, and a region which does not correspond to a field of any camera based on colors, patterns and brightness, and causes the display apparatus to display each monitoring domain.

Note that the field display system 40 may include the display apparatus.

The information registering unit 2, the monitoring domain determining unit 4, the projecting unit 5, the segmenting unit 41 and the display control unit 42 are realized by, for example, a CPU of a computer which operates according to a field display program. In this case, the CPU only needs to read the field display program, and operate as the information registering unit 2, the monitoring domain determining unit 4, the projecting unit 5, the segmenting unit 41 and the display control unit 42. Further, the field display program may be recorded in a computer-readable recording medium. Furthermore, the information registering unit 2, the monitoring domain determining unit 4, the projecting unit 5, the segmenting unit 41 and the display control unit 42 may be respectively realized by different hardware.

Next, an operation will be described.

Figure 19:
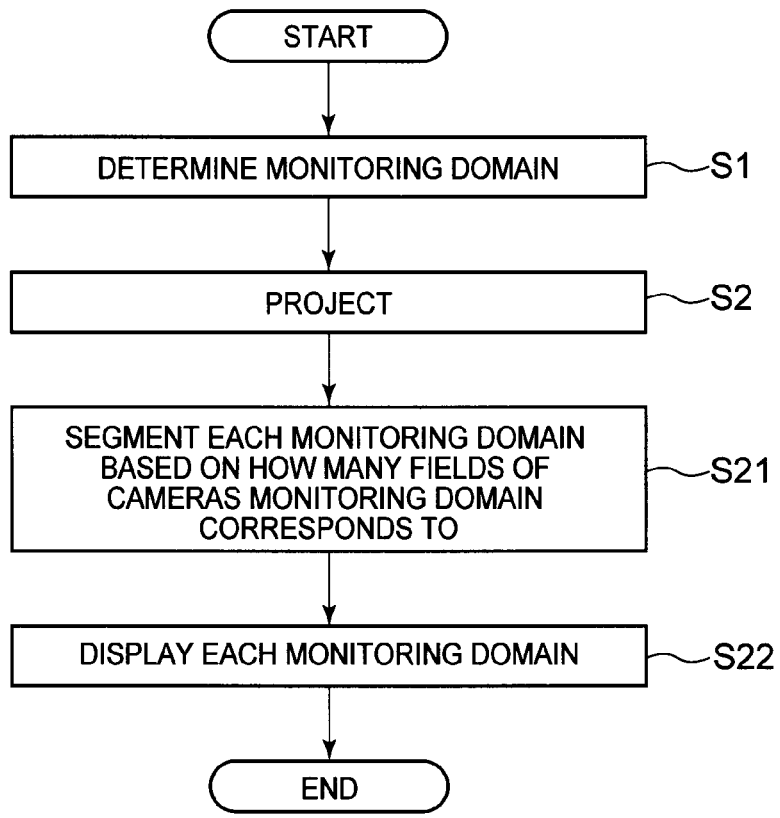
FIG. 19 It depicts a flowchart illustrating an example of steps of processing according to the fourth exemplary embodiment of the present invention.

FIG. 19 depicts a flowchart illustrating an example of steps of processing according to the fourth exemplary embodiment of the present invention. Steps S1 and S2 are the same as steps S1 and S2 in the first to third exemplary embodiments (see FIGS. 7, 11 and 17), and therefore will not be described. Further, a case will be described as an example where three monitoring domains $h_0$ to $h_2$ illustrated in FIG. 2 are determined, and camera parameters of three cameras 21 to 23 (see FIG. 4) are stored in the information memory unit 3.

According to processing up to step S2, a result obtained by projecting an image region of each of the cameras 21 to 23 on each monitoring domain is obtained as illustrated in FIG. 5. That is, a projection result of the image region of the camera 21, a projection result of the image region of the camera 22 and a projection result of the image region of the camera 23 related to the monitoring domain $h_2$ are obtained. Similarly, a projection result of the image region of each camera related to the monitoring domain $h_1$, and a projection result of the image region of each camera related to the monitoring domain $h_0$ are obtained.

After step S2, the segmenting unit 41 segments each monitoring domain based on how many fields of cameras each monitoring domain corresponds to (step S21).

Figure 20:
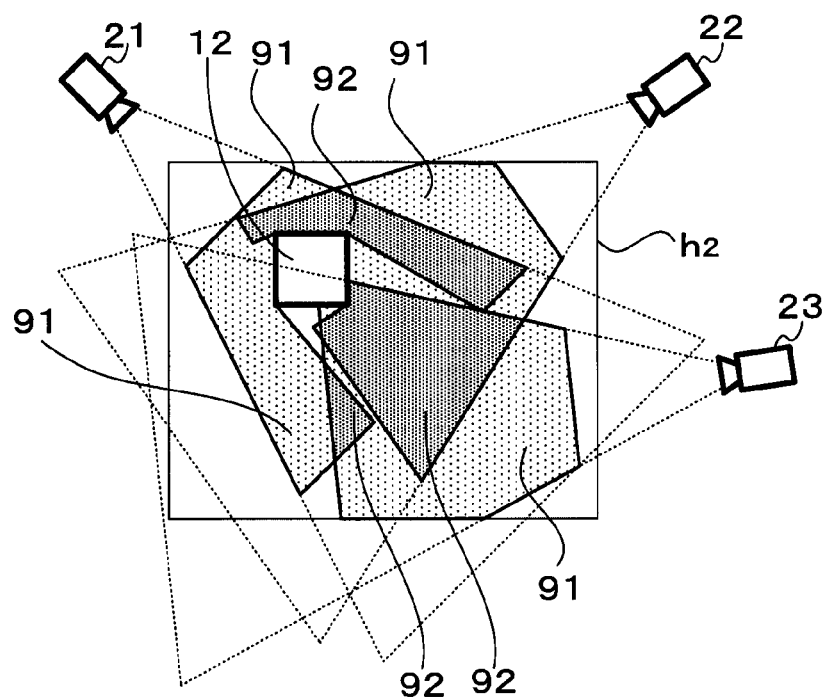
FIG. 20 It depicts an explanatory view illustrating an example of a segmentation result of monitoring domains.

For example, based on the projection result of the image region of the camera 21, the projection result of the image region of the camera 22, and the projection result of the image region of the camera 23 related to the monitoring domain $h_2$ (see an upper part in FIG. 5), the segmenting unit 41 segments the monitoring domain $h_2$ into a region corresponding to fields of the three cameras, a region corresponding to fields of the two cameras, a region corresponding to a field of one camera, and a region which does not correspond to any camera. FIG. 20 illustrates a result obtained by segmenting the monitoring domain $h_2$ based on the projection result related to the monitoring domain $h_2$ illustrated in the upper part in FIG. 5.

Figure 21:
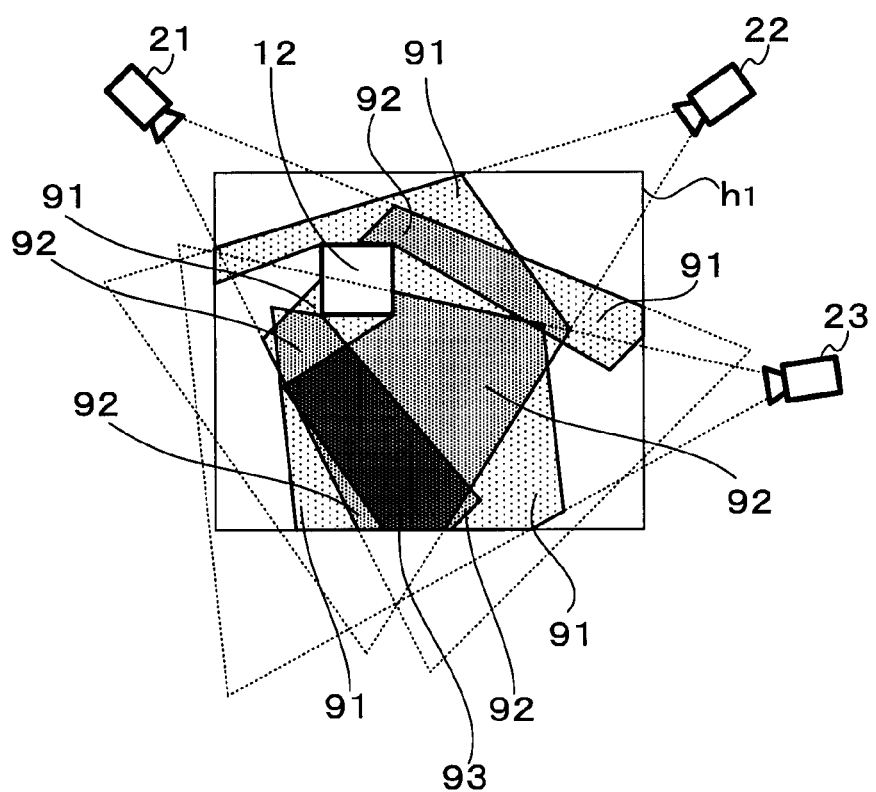
FIG. 21 It depicts an explanatory view illustrating an example of a segmentation result of monitoring domains.

Similarly, based on the projection result of the image region of the camera 21, the projection result of the image region of the camera 22, and the projection result of the image region of the camera 23 related to the monitoring domain $h_1$ (see a middle part in FIG. 5), the segmenting unit 41 segments the monitoring domain $h_1$ into a region corresponding to fields of the three cameras, a region corresponding to fields of the two cameras, a region corresponding to a field of one camera, and a region which does not correspond to any camera. FIG. 21 illustrates a result obtained by segmenting the monitoring domain $h_1$ based on the projection result related to the monitoring domain $h_1$ illustrated in the middle part in FIG. 5.

Figure 22:
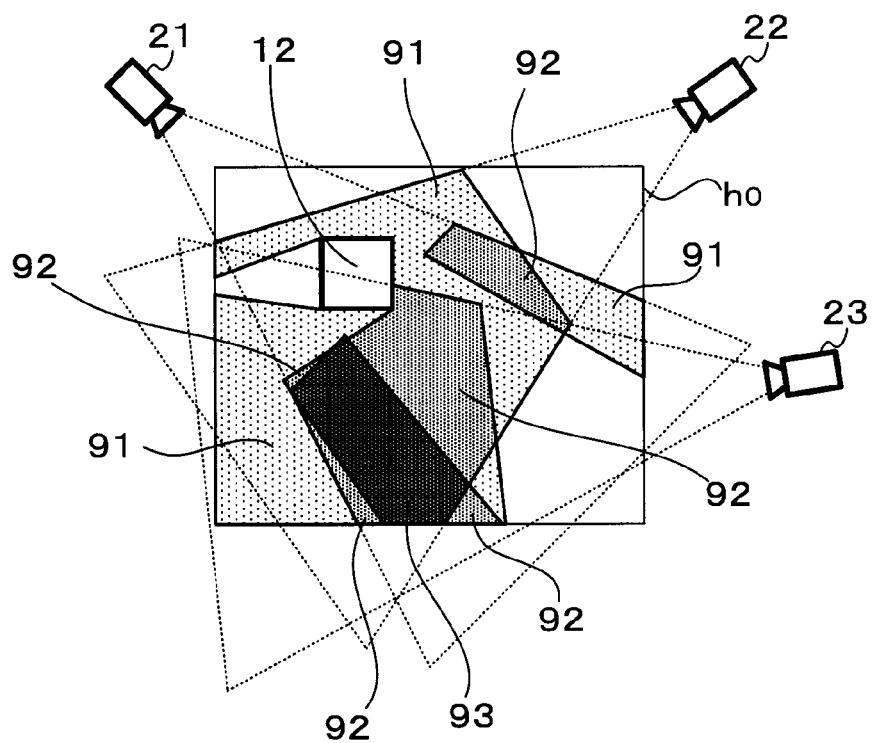
FIG. 22 It depicts an explanatory view illustrating an example of a segmentation result of monitoring domains.

Similarly, based on the projection result of the image region of the camera 21, the projection result of the image region of the camera 22, and the projection result of the image region of the camera 23 related to the monitoring domain $h_0$ (see a lower part in FIG. 5), the segmenting unit 41 segments the monitoring domain $h_0$ into a region corresponding to fields of the three cameras, a region corresponding to fields of the two cameras, a region corresponding to a field of one camera, and a region which does not correspond to any camera. FIG. 22 illustrates a result obtained by segmenting the monitoring domain $h_0$ based on the projection result related to the monitoring domain $h_0$ illustrated in the lower part in FIG. 5.

As illustrated in FIGS. 20 to 22, as a result of step S21, a result obtained by segmenting monitoring domains is obtained per monitoring domain. In FIGS. 20 to 22, a region corresponding to the field of one camera is indicated by a reference numeral "91". Further, the region corresponding to the fields of the two cameras is indicated by a reference numeral "92". Furthermore, the region corresponding to the fields of the three cameras is indicated by a reference numeral "93". A region which does not correspond to any camera is indicated in white. Further, the segmenting unit 41 may exclude the range in which the obstacle 12 exists from a segmentation target in each of the monitoring domains $h_0$ to $h_2$.

After step S21, the display control unit 42 causes the display apparatus (not illustrated) to display each of the segmented monitoring domains $h_0$ to $h_2$ (step S22). In step S22, the display control unit 42 displays a region segmented in an individual monitoring domain according to a mode which supports the number of cameras which include the region in the fields.

Figure 23:
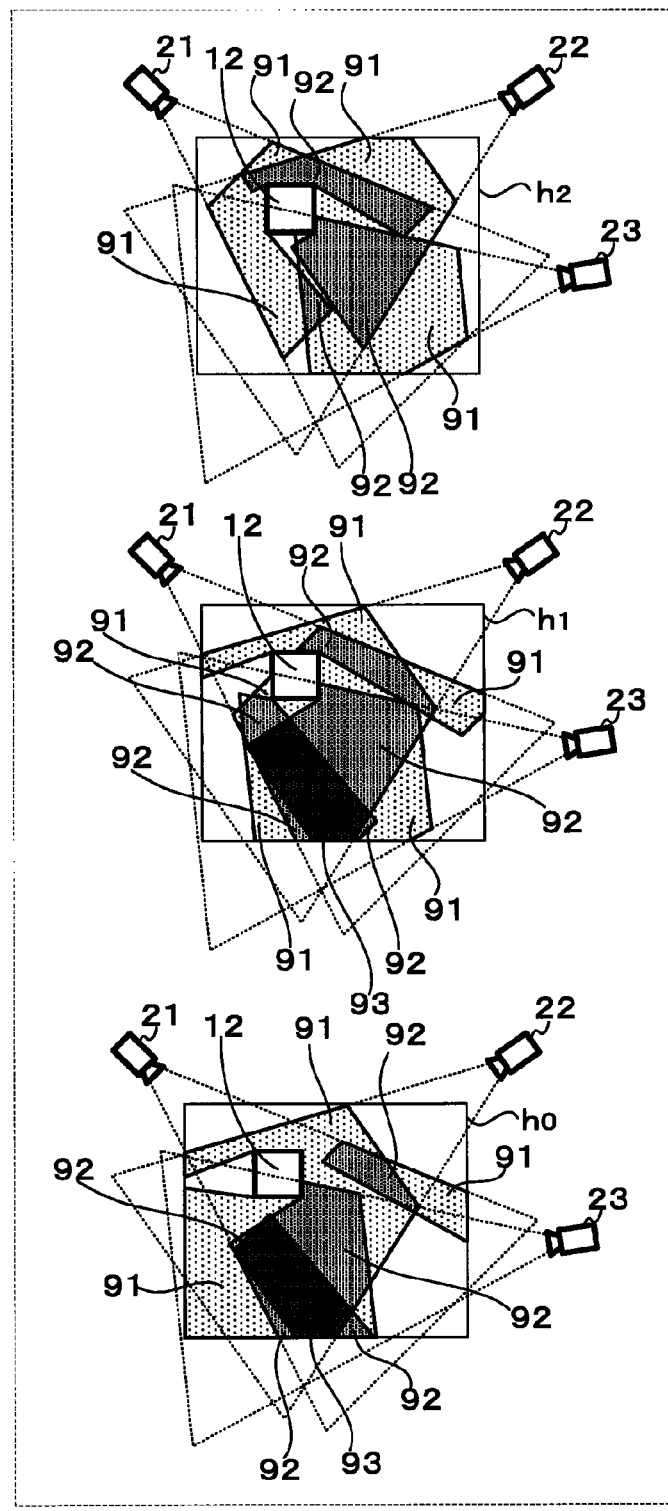
FIG. 23 It depicts an explanatory view illustrating an example of a display format in step S22.

FIG. 23 depicts an explanatory view illustrating an example of a display format in step S22. The display control unit 42 may cause the display apparatus to arrange and display each of the segmented monitoring domains $h_0$ to $h_2$ as top views illustrated in FIG. 23. In a display example illustrated in FIG. 23, different patterns are used for the region 91 corresponding to a field of one camera, the region 92 corresponding to fields of two cameras, the region 93 corresponding to fields of three cameras, and other regions. The display control unit 7 causes the display apparatus to also display the range in which the obstacle 12 exists.

Further, as a display format of each monitoring domain in step S22, the following display format may be adopted. That is, the display control unit 42 may cause the display apparatus to display perspective views in which the monitoring domains $h_0$ to $h_2$ segmented as illustrated in FIGS. 20, 21 and 23 are arranged at positions corresponding to the monitoring domains $h_0$ to $h_2$ in a three-dimensional space. In this example, the display control unit 42 causes the display apparatus to display a perspective view in which there is the monitoring domain $h_1$ as an upper layer of the monitoring domain $h_0$ and the monitoring domain $h_2$ is on this upper layer. Even in this display format, a region in each of the monitoring domains $h_0$ to $h_1$ is displayed with a different pattern depending on how many fields of cameras the region corresponds to.

Further, the display control unit 42 may cause the display apparatus to display a perspective view in which each monitoring domain is arranged in a three-dimensional space as described above, and a larger three-dimensional object is arranged in the segmented region of the monitoring domain as the number of cameras which include this region in the fields is higher. Although the shape of this three-dimensional object is not limited in particular, a case will be described as an example where the three-dimensional object is a ball. Further, ball sizes include three sizes of large, medium and small.

In this example, the display control unit 42 determines a state in which there is the monitoring domain $h_1$ as the upper layer of the monitoring domain $h_0$ and the monitoring domain $h_2$ is on this upper layer. Further, the display control unit 42 determines a state in which a large ball crossing the region 93 is arranged in the region 93 (see FIGS. 21 and 22) corresponding to the fields of the three cameras in each of the monitoring domains $h_0$ to $h_2$. Similarly, the display control unit 42 determines a state in which a medium size ball crossing the region 92 is arranged in the region 92 (see FIGS. 21 and 22) corresponding to the fields of the two cameras in each of the monitoring domains $h_0$ to $h_2$, and determines a state in which a small ball crossing the region 91 is arranged in the region 91 (see FIGS. 21 and 22) corresponding to the field of the one camera. The display control unit 42 may cause the display apparatus to display the perspective view of this state.

Further, when causing the display apparatus to display the perspective view in which each of the monitoring domains $h_0$ to $h_2$ is arranged in a three-dimensional space, the display control unit 42 may update the perspective view by changing a view point according to a user operation.

The user can check, according to each displayed monitoring domain, which region is in the fields of the cameras 21 to 23 in the three monitoring domains $h_0$ to $h_2$ corresponding to three types of heights in the three-dimensional space. Consequently, even in the fourth exemplary embodiment, it is possible to obtain the same effect as that in each of the above exemplary embodiments.

According to the fourth exemplary embodiment in particular, a region in a monitoring domain is segmented according to how many fields of cameras the region corresponds to and displayed, so that it is possible to intelligibly present to the user that an image of a target to be monitored (for example, a person) is captured by more cameras. Consequently, the user can easily learn a range in which fields of more cameras overlap.

Further, as described above, when the user is presented with a perspective view in which a larger three-dimensional object (for example, a ball) is arranged in a region segmented in a monitoring domain as the number of cameras which include this region in the field is higher, the user can easily learn how many cameras capture images of a target to be monitored based on the size of this three-dimensional object.

Next, a modified example of the fourth exemplary embodiment will be described. In the fourth exemplary embodiment, in step S22, the display control unit 42 may cause the display apparatus to highlight a region included in fields of the specified number of cameras. A method of specifying the number of cameras is not limited in particular. For example, the user may input the number of cameras in the field display system 40 and the display control unit 42 may cause the display apparatus to highlight a region included in fields of the user-specified number of cameras. The number of cameras to be specified is not limited to one value such as "one", and may be specified as a range of "one or more and the total number (three in this example) or less". Hereinafter, a case will be described as an example where top views of monitoring domains are presented as illustrated in FIG. 23. Note that the monitoring domain $h_0$ illustrated in a lower part in FIG. 23 will be described as an example.

Figure 24:
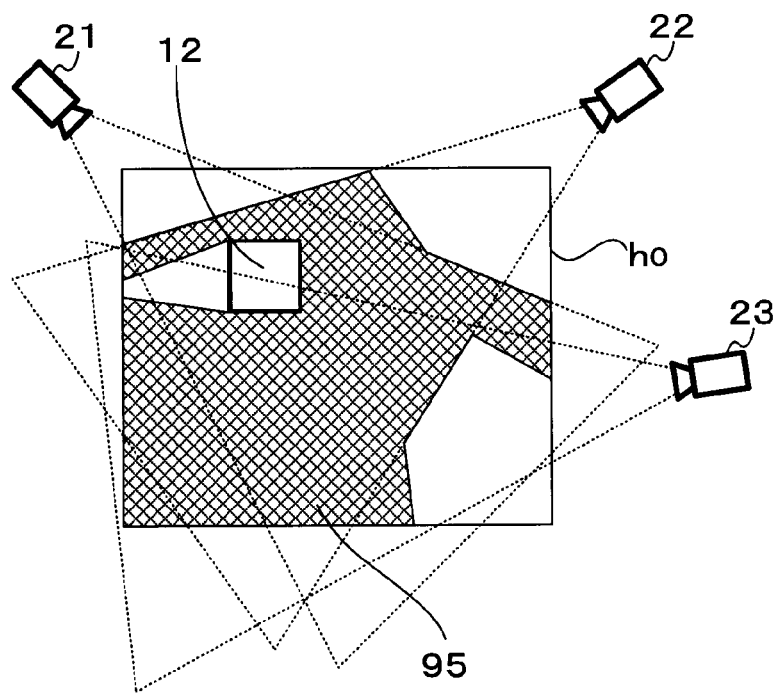
FIG. 24 It depicts an explanatory view illustrating an example of highlighting according to the fourth exemplary embodiment.

FIG. 24 depicts an explanatory view illustrating an example of highlighting a region included in fields of the specified number of cameras. FIG. 24 illustrates an example of highlighting in the monitoring domain $h_0$.

The display control unit 42 causes the display apparatus to display the monitoring domains $h_0$ to $h_2$ as illustrated in FIG. 23. Further, the user specifies a range of "one or more and three or less" as the number of cameras. This means that a command to highlight a region included in fields of one, two or three cameras is received from the outside. In response to user's specifying of the number of cameras, the display control unit 42 highlights a region obtained by combining the region 91 corresponding to a field of one camera, the region 92 corresponding to fields of two cameras and the region 93 corresponding to fields of three cameras in the monitoring domain $h_0$ as illustrated in FIG. 24. The region 95 highlighted in an example of FIG. 24 is a region obtained by combining the regions 91 to 93 in the monitoring domain $h_0$. Although the monitoring domain $h_0$ has been described as an example, the display control unit 42 performs highlighting likewise in the monitoring domains $h_1$ and $h_2$ illustrated in FIG. 23. In the present modified example, it is possible to intelligibly present to the user a range included in fields of the specified number of cameras.

Figure 25:
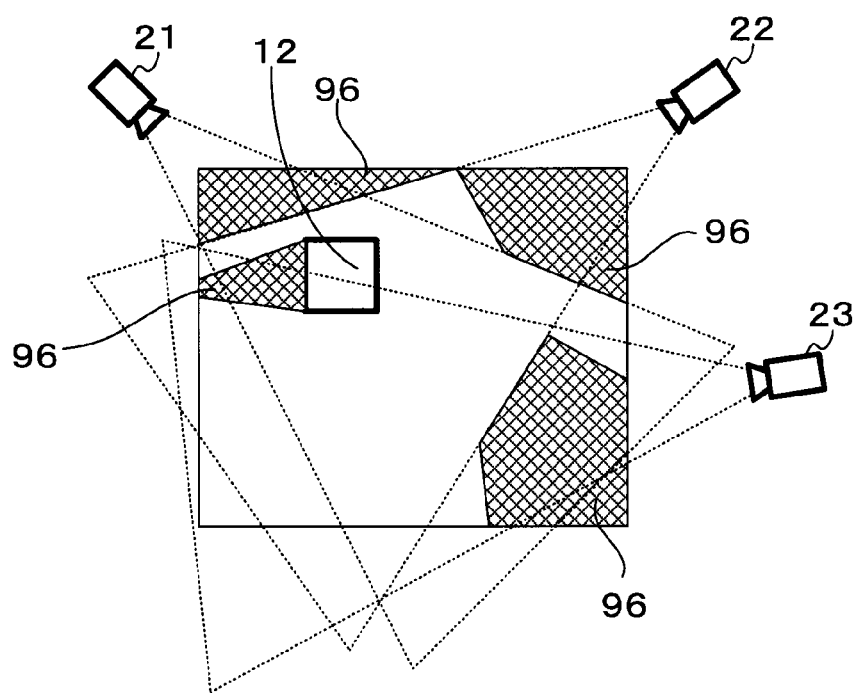
FIG. 25 It depicts an explanatory view illustrating an example of highlighting according to the fourth exemplary embodiment.

Further, only "0" may be specified as the number of cameras. FIG. 25 depicts an explanatory view illustrating an example of a region to be highlighted in this case. FIG. 25 illustrates an example of highlighting in the monitoring domain $h_0$ similar to FIG. 24. The region 96 highlighted in an example illustrated in FIG. 25 is a range not included in a field of any camera. In other words, the region 96 is a range which is a blind angle for all cameras. The display control unit 42 performs highlighting likewise in the monitoring domains $h_1$ and $h_2$ illustrated in FIG. 23. As illustrated in FIG. 25, by specifying "0" as the number of cameras, the user can easily check a range which is a blind angle for all cameras.

Further, when performing highlighting, the display control unit 42 preferably causes the display apparatus to also display a range in which the obstacle 12 exists.

Furthermore, when causing the display apparatus to display a perspective view in which each monitoring domain is arranged in a three-dimensional space, the display control unit 42 may highlight a region included in fields of the specified number of cameras in each monitoring domain.

Still further, when highlighting the region included in fields of the specified number of cameras, the field display system 40 may calculate a cover rate which is a ratio of the area of a region to be highlighted (referred to as a "highlighted region" below), to the area of the monitoring domain. This definition of the cover rate is different from the definition of the cover rate in the second exemplary embodiment and the definition of the cover rate in the third exemplary embodiment. Although the cover rate used in the modified example of the fourth exemplary embodiment can be referred to as "a highlighted display region cover rate", this cover rate is simply referred to as a "cover rate" for ease of description.

Figure 26:
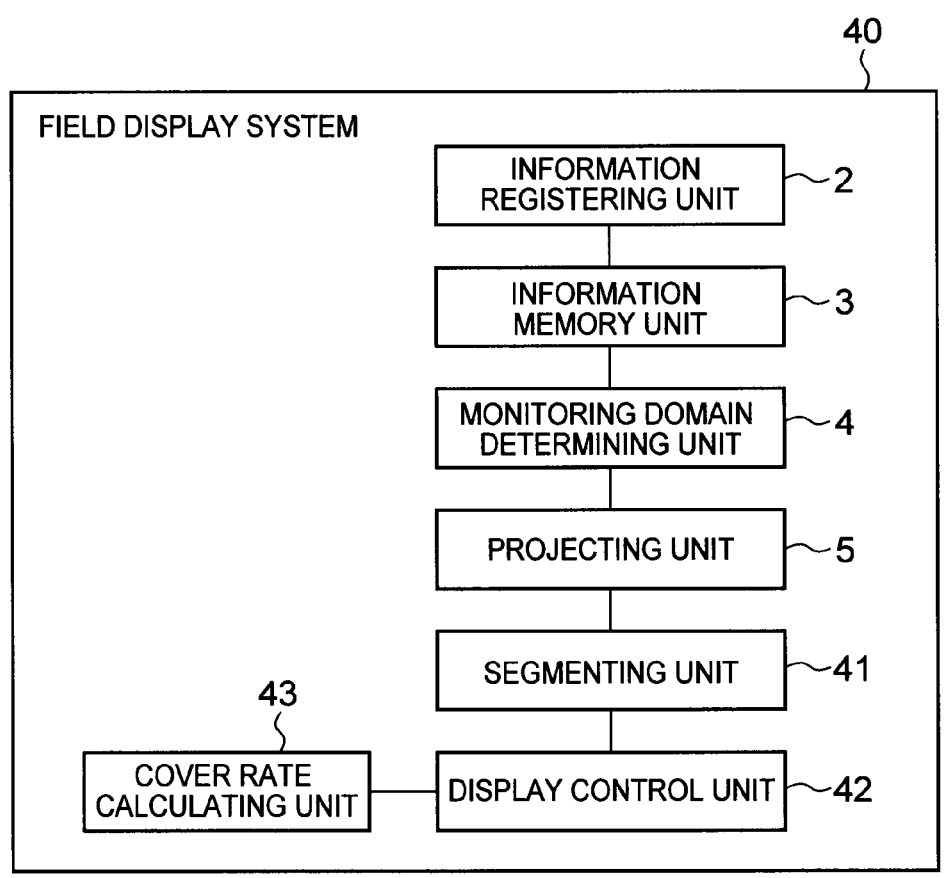
FIG. 26 It depicts a block diagram illustrating another exemplary configuration of the field display system according to the fourth exemplary embodiment of the present invention.

FIG. 26 depicts a block diagram illustrating an exemplary configuration in a case where a cover rate is calculated in the fourth exemplary embodiment. The same components as those illustrated in FIG. 18 will be assigned the same reference numerals as those in FIG. 18 and will not be described.

The cover rate calculating unit 43 calculates a cover rate when the display control unit 42 highlights a region included in fields of the specified number of cameras. Further, the display control unit 42 causes the display apparatus to display the calculated cover rate and a monitoring domain to be highlighted.

The cover rate calculating unit 43 may calculate a cover rate per monitoring domain or calculate a cover rate of all of a plurality of monitoring domains.

Calculation in a case where the cover rate calculating unit 43 calculates a cover rate per monitoring domain will be described. When calculating the cover rate per monitoring domain, the cover rate calculating unit 43 calculates a cover rate by calculating following equation (3) per monitoring domain.

[Math. 3]

$$\text{Cover rate} = \frac{\text{Area of highlighted region}}{\text{Area of monitoring domain}} \quad \text{Equation (3)}$$

For example, when calculating the cover rate in the monitoring domain $h_0$ illustrated in FIG. 24, the cover rate calculating unit 43 calculates, as a cover rate, a ratio of the area of a highlighted region 95 (see FIG. 24) to the area of the monitoring domain $h_0$. The cover rate calculating unit 43 calculates the cover rate of the monitoring domain $h_1$ and the cover rate of the monitoring domain $h_2$ likewise.

In this case, the display control unit 42 causes the display apparatus to display a cover rate calculated per monitoring domain. For example, when causing the display apparatus to highlight the region in each of the monitoring domains $h_0$ to $h_2$, the display control unit 42 only needs to cause the display apparatus to display a cover rate corresponding to the vicinity of each of the monitoring domains $h_0$ to $h_2$.

Next, calculation in a case where the cover rate calculating unit 43 calculates a cover rate of the entirety of a plurality of monitoring domains will be described. Meanwhile, n+1 monitoring domains $h_0$ to $h_n$ are determined. The cover rate calculating unit 43 calculates a cover rate by calculating following equation (4).

[Math. 4]

$$\text{Cover rate} = \frac{\sum_{i=0}^{n} \text{Area of highlighted region of monitoring domain } h_i}{\sum_{i=0}^{n} \text{Area of monitoring domain } h_i} \quad \text{Equation (4)}$$

That is, the cover rate calculating unit 43 calculates, as a cover rate, a ratio of a total sum of the areas of highlighted regions in each of monitoring domains $h_0$ to $h_n$ to a total sum of the areas of the monitoring domains $h_0$ to $h_n$. When, for example, three monitoring domains $h_0$ to $h_2$ are determined, the cover rate calculating unit 43 calculates a total sum of the area of the highlighted region in the monitoring domain $h_0$, the area of a highlighted region in the monitoring domain $h_1$, and the area of the highlighted region in the monitoring domain $h_2$. The cover rate calculating unit 43 then calculates, as a cover rate, a ratio of the total sum of the areas of these highlighted regions to the total sum of the areas of the monitoring domains $h_0$ to $h_2$.

When the cover rate calculating unit 43 calculates the cover rate according to equation (4), the number of cover rates to be calculated is one irrespective of the number of monitoring domains. The display control unit 42 causes the display apparatus to display the cover rate.

Figure 27:
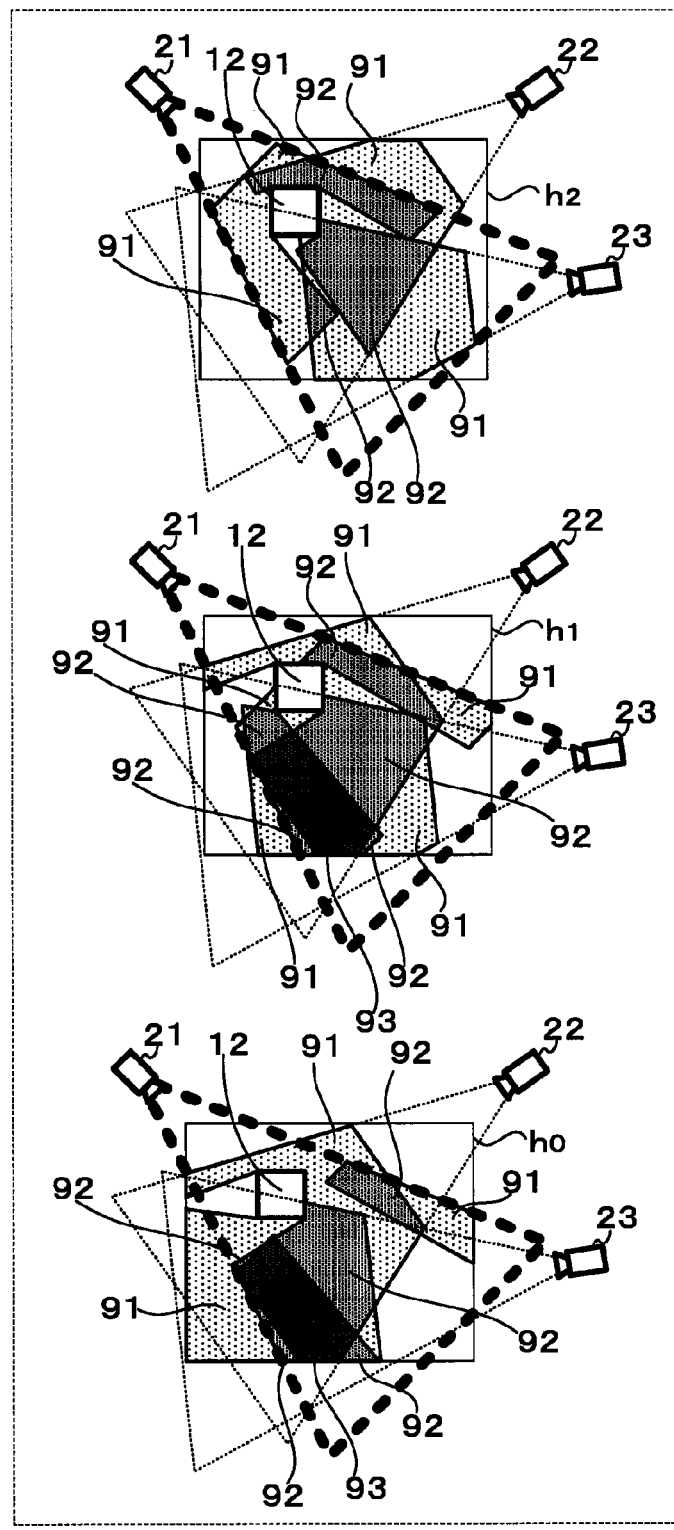
FIG. 27 It depicts an explanatory view illustrating an example of highlighting in a case where a camera is specified.

Further, in the fourth exemplary embodiment, in step S22, the display control unit 42 may receive user's specifying of a camera, and cause the display apparatus to highlight a range which settles in an image of this camera. For example, the display control unit 42 causes the display apparatus to display the monitoring domains $h_0$ to $h_2$ as illustrated in FIG. 23. Further, when, for example, the camera 21 is specified, the display control unit 42 causes the display apparatus to highlight a range which settles in an image of the camera 21 as illustrated in FIG. 27. In this case, it is possible to intelligibly present to the user a range which settles in the image of the specified camera. Note that, although FIG. 27 highlights the range which settles in the image of the camera 21, highlighting may be performed by other methods. Meanwhile, although highlighting a range which settles in an image of a specified camera has been described as the modified example of the fourth exemplary embodiment, a range which settles in an image of a specified camera may be highlighted also in each of the above exemplary embodiments.

Note that, although cases have been described in each of the above exemplary embodiments as examples where the number of monitoring domains is three and the number of cameras is three, the number of monitoring domains and that of cameras are not limited to the numbers described in the above exemplary embodiments.

Figure 28:
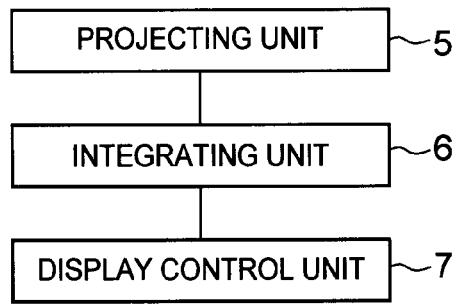
FIG. 28 It depicts a block diagram illustrating an example of main components according to the present invention.

Next, main components of the present invention will be described. FIG. 28 depicts a block diagram illustrating an example of main components according to the present invention.

A projecting unit 5 projects a position in an image captured by a camera, on a plurality of monitoring domains obtained by moving, in parallel, a region to be monitored which defines a range to be checked for an image capturing situation of the camera. The monitoring domain is determined based on the height of a target to be monitored, an image of which is captured by the camera. The projecting unit 5 specifies fields of the plurality of monitoring domains as a range an image of which the camera can capture without being blocked by an obstacle.

An integrating unit 6 integrates the fields in the monitoring domains.

The display control unit 7 causes the display apparatus to display an integration result of fields.

According to this configuration, it is possible to intelligibly present to a user a range in which a camera can capture an image of the entire target to be monitored or a certain part or more of the target to be monitored.

Figure 29:
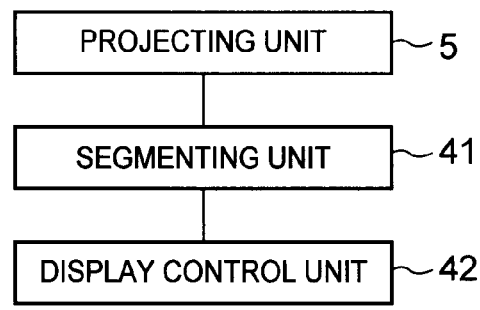
FIG. 29 It depicts a block diagram illustrating another example of main components according to the present invention.

FIG. 29 depicts a block diagram illustrating another example of main components according to the present invention. The projecting unit 5 is the same as the projecting unit 5 illustrated in FIG. 28, and will not be described.

The segmenting unit 41 segments each monitoring domain based on how many fields of cameras each monitoring domain corresponds to.

The display control unit 42 causes a display apparatus to display each monitoring domain such that a region segmented in an individual monitoring domain is displayed according to a mode which supports the number of cameras which include the region in the fields.

According to the configuration illustrated in FIG. 29, it is possible to intelligibly present to a user a range in which a camera can capture an image of the entire target to be monitored or a certain part or more of the target to be monitored.

Fifth Exemplary Embodiment

Figure 30:
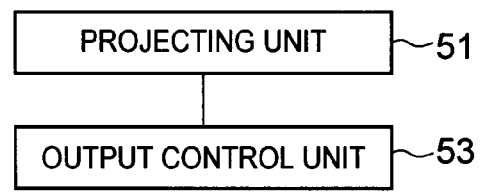
FIG. 30 It depicts a block diagram illustrating a configuration of a field display system according to a fifth exemplary embodiment.

FIG. 30 illustrates a configuration of a field display system according to a fifth exemplary embodiment of the present invention. The field display system according to the fifth exemplary embodiment includes a projecting unit 51 and an output control unit 53.

The projecting unit 51 projects a position in an image captured by a camera, on a plurality of planes determined based on the height of a target to be monitored, an image of which is captured by the camera, and specifies fields of the plurality of planes as a range an image of which can be captured by the camera.

The output control unit 53 stereoscopically outputs the planes the fields of which have been specified. The output control unit 53 can be referred to as a "stereoimage converting unit". The output control unit 53 stereoscopically outputs, on a space, overlaid planes fields of which have been specified, by means of a hologram, for example. Further, the output control unit 53 may cause a 3D printer to output, as an object, overlaid planes fields of which have been specified.

When the output control unit 53 outputs the planes the fields of which have been specified, the projecting unit 51 may project a position in an image captured by the camera, on a plurality of planes minutely set to a monitoring space, and specify fields of the plurality of planes as a range an image of which can be captured by the camera.

According to the fifth exemplary embodiment, the output control unit 53 causes, for example, a 3D printer to print each minutely set plane, and overlays the planes like bricks to be output, so that the user can stereoscopically check the inside. By this means, for example, many people can efficiently study a camera arrangement.

Figure 31:
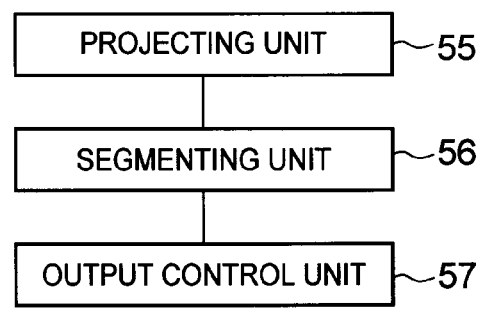
FIG. 31 It depicts a block diagram illustrating another exemplary configuration of the field display system according to the present invention.

Further, the field display system according to the present invention may be configured as illustrated in FIG. 31. The field display system illustrated in FIG. 31 includes a projecting unit 55, a segmenting unit 56, and an output control unit 57.

The projecting unit 55 is the same as the projecting unit 51 illustrated in FIG. 30. More specifically, the projecting unit 55 projects a position in an image captured by a camera, on a plurality of planes determined based on the height of a target to be monitored, an image of which is captured by the camera, and specifies fields of the plurality of planes as a range an image of which can be captured by the camera. For example, the projecting unit 55 specifies the fields as a range an image of which the camera can capture without being blocked by an obstacle. Further, this plane is obtained by moving, in parallel, a region to be monitored which defines a check target range of an image capturing situation of the camera.

The segmenting unit 56 segments each plane based on how many fields of cameras each plane corresponds to.

The output control unit 57 outputs each plane to display a region segmented in an individual plane according to a mode which supports the number of cameras which include the region in fields.

For example, the output control unit 57 may planarly overlay stereoimages matching the number of cameras which include the segmented region in the fields to stereoscopically display, on a space, by means of a hologram. Further, for example, the output control unit 57 may cause a 3D printer to output, as an object, a shape obtained by planarly overlaying stereoimages matching the number of cameras which include the segmented region in the fields.

Figure 32:
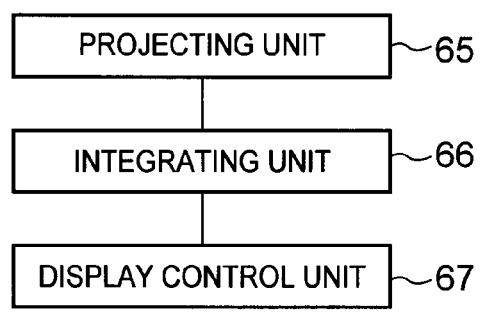
FIG. 32 It depicts a block diagram illustrating another exemplary configuration of the field display system according to the present invention.

Furthermore, the field display system according to the present invention may be configured as illustrated in FIG. 32. The field display system illustrated in FIG. 32 includes a projecting unit 65, an integrating unit 66, and a display control unit 67. The projecting unit 65 is the same as the projecting unit 51 illustrated in FIG. 30 and the projecting unit 55 illustrated in FIG. 31.

The integrating unit 66 integrates the fields in the planes. This integration processing may be the same as the integration processing described above.

The display control unit 67 causes the display apparatus to display an integration result of fields.

Figure 33:
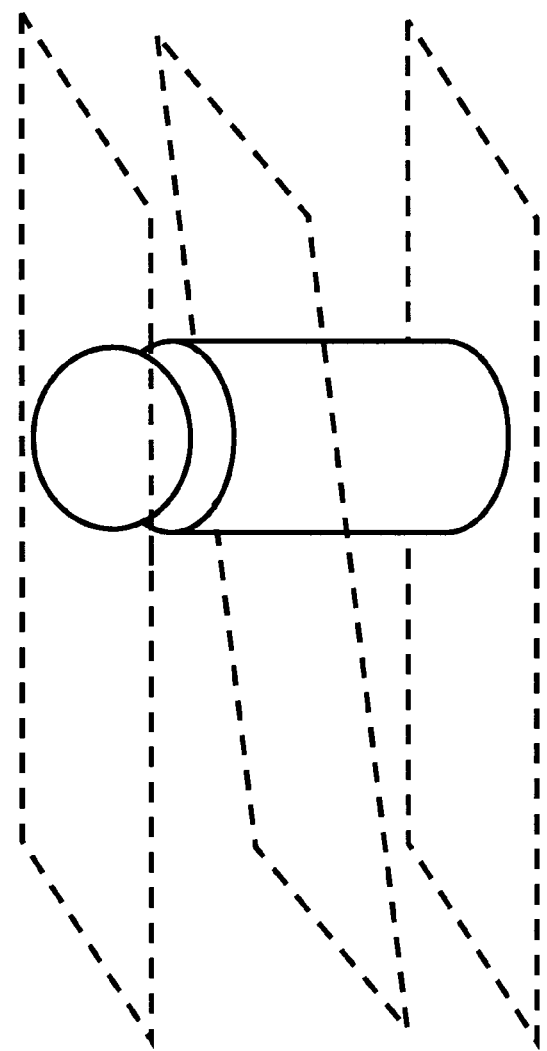
FIG. 33 It depicts an explanatory view illustrating an example in which virtual planes are not parallel to a region to be monitored.
Figure 34:
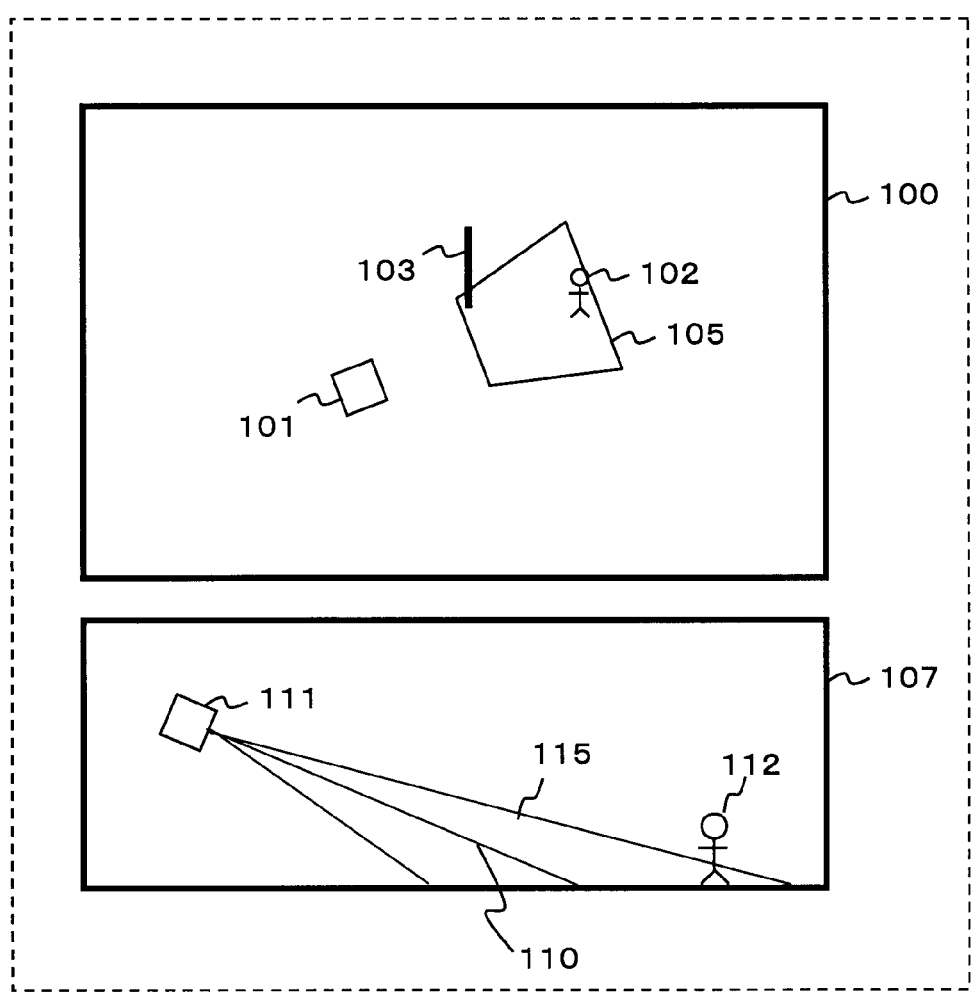
FIG. 34 It depicts a schematic view illustrating a horizontal field of view and a vertical field of view displayed by a technique disclosed in Patent Literature 1.

Note that, although projection processing or the like is performed on a monitoring domain obtained by moving a region to be monitored in parallel, a target subjected to processing of the present invention is not limited to a monitoring domain. More specifically, the projecting unit 51 may project a position in an image captured by the camera, on a plurality of virtual planes on a space, the images of which can be captured by the camera. In this case, the plurality of virtual planes may not necessarily be parallel to a region to be monitored. FIG. 33 illustrates an example in which a central virtual plane of three virtual planes is not parallel to the region to be monitored. Projection on virtual planes as illustrated in FIG. 33 is also included in the present invention.

Although a part or entirety of the above exemplary embodiments can be described as in the following Supplementary notes, the exemplary embodiments are by no means limited to the Supplementary notes below.

(Supplementary note 1) A field display system including: projecting means configured to project a position in an image captured by a camera, on a plurality of monitoring domains obtained by moving, in parallel, a region to be monitored which defines a range to be checked for an image capturing situation of the camera, the monitoring domain being determined based on a height of a target to be monitored, an image of which is captured by the camera, and to specify fields of the plurality of monitoring domains as a range an image of which the camera captures without being blocked by an obstacle; integrating means configured to integrate the fields in the monitoring domains; and display control means configured to cause a display apparatus to display an integration result of the fields.

(Supplementary note 2) The field display system according to Supplementary note 1, wherein the integrating means extracts a region corresponding to a field of each monitoring domain as the integration result of the fields per camera, and the display control means causes the display apparatus to display the extracted region per camera.

(Supplementary note 3) The field display system according to Supplementary note 1, wherein the integrating means includes field rate calculating means configured to perform, per camera, processing of calculating a field rate which is a ratio of the number of monitoring domains, positions of which belong to the fields, to a total number of monitoring domains, per position outside a range in the region to be monitored in which the obstacle exists, and the display control means causes the display apparatus to display, per camera, a region corresponding to each field rate in the region to be monitored according to a mode which supports the field rate.

(Supplementary note 4) The field display system according to Supplementary note 3, wherein the integrating means includes cover rate calculating means configured to calculate, per camera, a cover rate which is a ratio of a sum of calculated field rates, to the number of positions, field rates of which have been calculated in the region to be monitored, and the display control means causes the display apparatus to display the cover rate of each camera.

(Supplementary note 5) The field display system according to Supplementary note 3 or 4, wherein the display control means causes the display apparatus to highlight a region corresponding to a field rate falling within a specified numerical value range.

(Supplementary note 6) The field display system according to Supplementary note 1, wherein the integrating means includes: field rate calculating means configured to perform, per camera, processing of calculating a field rate which is a ratio of the number of monitoring domains, positions of which belong to the fields, to a total number of monitoring domains, per position outside a range in the region to be monitored in which the obstacle exists; and average field rate calculating means configured to calculate, per position outside the range in the region to be monitored in which the obstacle exists, an average field rate which is an average value of field rates of predetermined top rank orders out of field rates calculated per camera for the position, and the display control means causes the display apparatus to display a region corresponding to each average field rate in the region to be monitored according to a mode which supports the average field rate.

(Supplementary note 7) The field display system according to Supplementary note 6, wherein the integrating means includes cover rate calculating means configured to calculate a cover rate which is a ratio of a sum of calculated average field rates to the number of positions, field rates of which have been calculated in the region to be monitored, and the display control means causes the display apparatus to display the cover rate.

(Supplementary note 8) The field display system according to Supplementary note 6 or 7, wherein the display control means causes the display apparatus to highlight a region corresponding to an average field rate falling within a specified numerical value range.

(Supplementary note 9) A field display system including: projecting means configured to project a position in an image captured by a camera, on a plurality of monitoring domains obtained by moving, in parallel, a region to be monitored which defines a range to be checked for an image capturing situation of the camera, the monitoring domain being determined based on a height of a target to be monitored, an image of which is captured by the camera, and to specify fields of the plurality of monitoring domains as a range an image of which the camera captures without being blocked by an obstacle; segmenting means configured to segment each monitoring domain based on how many fields of cameras each monitoring domain corresponds to; and display control means configured to cause the display apparatus to display each monitoring domain to display a region segmented in an individual monitoring domain according to a mode which supports the number of cameras which include the region in the fields.

(Supplementary note 10) The field display system according to Supplementary note 9, wherein the display control means causes the display apparatus to arrange and display each monitoring domain as a top view.

(Supplementary note 11) The field display system according to Supplementary note 9, wherein the display control means causes the display apparatus to display a perspective view in which each monitoring domain is arranged in a three-dimensional space.

(Supplementary note 12) The field display system according to Supplementary note 9 or 11, wherein the display control means causes the display apparatus to display a perspective view in which each monitoring domain is arranged in a three-dimensional space, and a larger three-dimensional object is arranged in the region segmented in the monitoring domain as the number of cameras which include the region in the fields is higher.

(Supplementary note 13) The field display system according to any one of Supplementary notes 9 to 12, wherein the display control means causes the display apparatus to highlight a region included in fields of a specified number of cameras.

(Supplementary note 14) The field display system according to Supplementary note 13, further including: cover rate calculating means configured to calculate a cover rate which is a ratio of an area of the highlighted region to an area of a monitoring domain, wherein the display control means causes the display apparatus to display the cover rate.

(Supplementary note 15) The field display system according to Supplementary note 14, wherein the cover rate calculating means calculates the cover rate per monitoring domain, and the display control means causes the display apparatus to display the cover rate of each monitoring domain.

(Supplementary note 16) The field display system according to Supplementary note 14, wherein the cover rate calculating means calculates, as the cover rate, a ratio of a total sum of areas of regions highlighted in the monitoring domains, to a total sum of areas of the monitoring domains, and the display control means causes the display apparatus to display the cover rate.

(Supplementary note 17) A field display system including: projecting means configured to project a position in an image captured by a camera, on a plurality of planes determined based on a height of a target to be monitored, an image of which is captured by the camera, and to specify fields of the plurality of planes as a range an image of which is captured by the camera; integrating means configured to integrate the fields in the planes; and display control means configured to cause a display apparatus to display an integration result of the fields.

(Supplementary note 18) The field display system according to Supplementary note 17, wherein the plane is obtained by moving, in parallel, a region to be monitored which defines a range to be checked for an image capturing situation of the camera.

(Supplementary note 19) The field display system according to Supplementary note 17 or 18, wherein the projecting means specifies fields as a range an image of which the camera captures without being blocked by an obstacle.

(Supplementary note 20) A field display system including: projecting means configured to project a position in an image captured by a camera, on a plurality of planes determined based on a height of a target to be monitored, an image of which is captured by the camera, and to specify fields of the plurality of planes as a range an image of which is captured by the camera; and output control means configured to stereoscopically output the planes the fields of which have been specified.

(Supplementary note 21) The field display system according to Supplementary note 20, wherein the output control means stereoscopically displays, on a space, overlaid planes the fields of which are specified.

(Supplementary note 22) The field display system according to Supplementary note 20, wherein the output control means causes a 3D printer to output, as an object, overlaid planes the fields of which are specified.

(Supplementary note 23) A field display system including: projecting means configured to project a position in an image captured by a camera, on a plurality of planes determined based on a height of a target to be monitored, an image of which is captured by the camera, and to specify fields of the plurality of planes as a range an image of which is captured by the camera; segmenting means configured to segment each plane based on how many fields of cameras each plane corresponds to; and output control means configured to output each plane to display a region segmented in an individual plane according to a mode which supports the number of cameras which include the region in the fields.

(Supplementary note 24) The field display system according to Supplementary note 23, wherein the plane is obtained by moving, in parallel, a region to be monitored which defines a range to be checked for an image capturing situation of the camera.

(Supplementary note 25) The field display system according to Supplementary note 23 or 24, wherein the projecting means specifies fields as a range an image of which the camera captures without being blocked by an obstacle.

(Supplementary note 26) The field display system according to any one of Supplementary notes 23 to 25, wherein the output control means planarly overlays and stereoscopically displays, on a space, stereoimages, the number of which corresponds to the number of cameras which include the segmented region in the fields.

(Supplementary note 27) The field display system according to any one of Supplementary notes 23 to 25, wherein the output control means causes a 3D printer to output, as an object, a shape obtained by planarly overlaying stereoimages, the number of which corresponds to the number of cameras which include the segmented region in the fields.

This application is based upon and claims the benefit of priority from Japanese Patent Application No. 2012-267552 filed on Dec. 6, 2012, the entire contents of which are incorporated herein by reference.

Although the present invention has been described above with reference to the exemplary embodiments, the present invention is by no means limited to the above exemplary embodiments. Configurations and details of the present invention can be variously changed within a scope of the present invention those skilled in the art can understand.

INDUSTRIAL APPLICABILITY

The present invention is suitably applied to a field display system which specifies a field of a camera that can capture an image of a target to be monitored well and displays this field.

REFERENCE SIGNS LIST

5 Projecting unit
6, 6a, 6b Integrating unit
7, 42 Display control unit
41 Segmenting unit
61 Field rate calculating unit
62 Average field rate calculating unit
43, 63a, 63b Cover rate calculating unit

The invention claimed is:

1. A field display system comprising:
a projecting unit, implemented by a processor, configured to project a position in an image captured by a camera, on a plurality of monitoring domains obtained by moving, in parallel, a region to be monitored which defines a range to be checked for an image capturing situation of the camera, the monitoring domain being determined based on a height of a target to be monitored, an image of which is captured by the camera, and to specify fields of the plurality of monitoring domains as a range an image of which the camera captures without being blocked by an obstacle;
an integrating unit, implemented by the processor, configured to integrate the fields in the monitoring domains, wherein the integrating unit comprises a field rate calculating unit, implemented by the processor, configured to perform, per camera, processing of calculating a field rate which is a ratio of the number of monitoring domains, positions of which belong to the fields, to a total number of monitoring domains, per position outside a range in the region to be monitored in which the obstacle exists; and
a display control unit, implemented by the processor, configured to cause a display apparatus to display an integration result of the fields, wherein the integration result of the fields includes, per camera, a region corresponding to each field rate in the region to be monitored according to a mode which supports the field rate.

2. A field display system comprising:
a projecting unit, implemented by a processor, configured to project a position in an image captured by a camera, on a plurality of monitoring domains obtained by moving, in parallel, a region to be monitored which defines a range to be checked for an image capturing situation of the camera, the monitoring domain being determined based on a height of a target to be monitored, an image of which is captured by the camera, and to specify fields of the plurality of monitoring domains as a range an image of which the camera captures without being blocked by an obstacle;
an integrating unit, implemented by the processor, configured to integrate the fields in the monitoring domains; and
a display control unit, implemented by the processor, configured to cause a display apparatus to display an integration result of the fields, wherein
the integrating unit extracts a region corresponding to a field of each monitoring domain as the integration result of the fields per camera, and
the display control unit causes the display apparatus to display the extracted region per camera.

3. The field display system according to claim 1, wherein:
the integrating unit comprises a cover rate calculating unit, implemented by the processor, configured to calculate, per camera, a cover rate which is a ratio of a sum of calculated field rates, to the number of positions, field rates of which have been calculated in the region to be monitored, and
the display control unit causes the display apparatus to display the cover rate of each camera.

4. The field display system according to claim 1, wherein the display control unit causes the display apparatus to highlight a region corresponding to a field rate falling within a specified numerical value range.

5. A field display system comprising:
a projecting unit, implemented by a processor, configured to project a position in an image captured by a camera, on a plurality of monitoring domains obtained by moving, in parallel, a region to be monitored which defines a range to be checked for an image capturing situation of the camera, the monitoring domain being determined based on a height of a target to be monitored, an image of which is captured by the camera, and to specify fields of the plurality of monitoring domains as a range an image of which the camera captures without being blocked by an obstacle;
an integrating unit, implemented by the processor, configured to integrate the fields in the monitoring domains; and
a display control unit, implemented by the processor, configured to cause a display apparatus to display an integration result of the fields,
wherein the integrating unit comprises:
a field rate calculating unit, implemented by the processor, configured to perform, per camera, processing of calculating a field rate which is a ratio of the number of monitoring domains, positions of which belong to the fields, to a total number of monitoring domains, per position outside a range in the region to be monitored in which the obstacle exists; and
an average field rate calculating unit, implemented by the processor, configured to calculate, per position outside the range in the region to be monitored in which the obstacle exists, an average field rate which is an average value of field rates of predetermined top rank orders out of field rates calculated per camera for the position, and the display control unit causes the display apparatus to display a region corresponding to each average field rate in the region to be monitored according to a mode which supports the average field rate.

6. The field display system according to claim 5, wherein: the integrating unit comprises a cover rate calculating unit, implemented by the processor, configured to calculate a cover rate which is a ratio of a sum of calculated average field rates to the number of positions, field rates of which have been calculated in the region to be monitored, and the display control unit causes the display apparatus to display the cover rate.

7. The field display system according to claim 5, wherein the display control unit causes the display apparatus to highlight a region corresponding to an average field rate falling within a specified numerical value range.

8. A field display system comprising:

a projecting unit, implemented by a processor, configured to project a position in an image captured by a camera, on a plurality of monitoring domains obtained by moving, in parallel, a region to be monitored which defines a range to be checked for an image capturing situation of the camera, the monitoring domain being determined based on a height of a target to be monitored, an image of which is captured by the camera, and to specify fields of the plurality of monitoring domains as a range an image of which the camera captures without being blocked by an obstacle;

a segmenting unit, implemented by the processor, configured to segment each monitoring domain based on how many fields of cameras each monitoring domain corresponds to; and a display control unit, implemented by the processor, configured to cause the display apparatus to display each monitoring domain to display a region segmented in an individual monitoring domain according to a mode which supports the number of cameras which include the region in the fields.

9. The field display system according to claim 8, wherein the display control unit causes the display apparatus to arrange and display each monitoring domain as a top view.

10. The field display system according to claim 8, wherein the display control unit causes the display apparatus to display a perspective view in which each monitoring domain is arranged in a three-dimensional space.

11. The field display system according to claim 8, wherein:

the display control unit causes the display apparatus to display a perspective view in which each monitoring domain is arranged in a three-dimensional space, and a larger three-dimensional object is arranged in the region segmented in the monitoring domain as the number of cameras which include the region in the fields is higher.

12. The field display system according to claim 8, wherein the display control unit causes the display apparatus to highlight a region included in fields of a specified number of cameras.

13. The field display system according to claim 12, further comprising:

a cover rate calculating unit, implemented by the processor, configured to calculate a cover rate which is a ratio of an area of the highlighted region to an area of a monitoring domain, wherein the display control unit causes the display apparatus to display the cover rate.

14. The field display system according to claim 13, wherein:

the cover rate calculating unit calculates the cover rate per monitoring domain, and the display control unit causes the display apparatus to display the cover rate of each monitoring domain.

15. The field display system according to claim 13, wherein:

the cover rate calculating unit calculates, as the cover rate, a ratio of a total sum of areas of regions highlighted in the monitoring domains, to a total sum of areas of the monitoring domains, and the display control unit causes the display apparatus to display the cover rate.

16. A field display method comprising:

projecting a position in an image captured by a camera, on a plurality of monitoring domains obtained by moving, in parallel, a region to be monitored which defines a range to be checked for an image capturing situation of the camera, the monitoring domain being determined based on a height of a target to be monitored, an image of which is captured by the camera, and specifying fields of the plurality of monitoring domains as a range an image of which the camera captures without being blocked by an obstacle;

integrating the fields in the monitoring domains; and causing a display apparatus to display an integration result of the fields, wherein when integrating the fields in the monitoring domains, performing, per camera, processing of calculating a field rate which is a ratio of the number of monitoring domains, positions of which belong to the fields, to a total number of monitoring domains, per position outside a range in the region to be monitored in which the obstacle exists, and wherein the integration result of the fields includes, per camera, a region corresponding to each field rate in the region to be monitored according to a mode which supports the field rate.

17. A field display method comprising:

projecting a position in an image captured by a camera, on a plurality of monitoring domains obtained by moving, in parallel, a region to be monitored which defines a range to be checked for an image capturing situation of the camera, the monitoring domain being determined based on a height of a target to be monitored, an image of which is captured by the camera, and specifying fields of the plurality of monitoring domains as a range an image of which the camera captures without being blocked by an obstacle;

segmenting each monitoring domain based on how many fields of cameras each monitoring domain corresponds to; and causing the display apparatus to display each monitoring domain to display a region segmented in an individual monitoring domain according to a mode which supports the number of cameras which include the region in the fields.

18. A non-transitory computer-readable recording medium in which a field display program is recorded, the field display program causing a computer to execute:

projection processing of projecting a position in an image captured by a camera, on a plurality of monitoring domains obtained by moving, in parallel, a region to be monitored which defines a range to be checked for an image capturing situation of the camera, the monitoring domain being determined based on a height of a target to be monitored, an image of which is captured by the camera, and specifying fields of the plurality of monitoring domains as a range an image of which the camera captures without being blocked by an obstacle;

integration processing of integrating the fields in the monitoring domains; and display control processing of causing a display apparatus to display an integration result of the fields, wherein the integrating processing includes:
performing, per camera, processing of calculating a field rate which is a ratio of the number of monitoring domains, positions of which belong to the fields, to a total number of monitoring domains, per position outside a range in the region to be monitored in which the obstacle exists, and wherein the integration result of the fields includes, per camera, a region corresponding to each field rate in the region to be monitored according to a mode which supports the field rate.

19. A non-transitory computer-readable recording medium in which a field display program is recorded, the field display program causing a computer to execute:

projection processing of projecting a position in an image captured by a camera, on a plurality of monitoring domains obtained by moving, in parallel, a region to be monitored which defines a range to be checked for an image capturing situation of the camera, the monitoring domain being determined based on a height of a target to be monitored, an image of which is captured by the camera, and specifying fields of the plurality of monitoring domains as a range an image of which the camera captures without being blocked by an obstacle;

segmentation processing of segmenting each monitoring domain based on how many fields of cameras each monitoring domain corresponds to; and display control processing of causing a display apparatus to display each monitoring domain to display a region segmented in an individual monitoring domain according to a mode which supports the number of cameras which include the region in the fields.

* * * * *